US011170949B2

(12) United States Patent
Kaito et al.

(10) Patent No.: US 11,170,949 B2
(45) Date of Patent: Nov. 9, 2021

(54) WINDER

(71) Applicant: KAIDO MANUFACTURING CO., LTD., Kusatsu (JP)

(72) Inventors: Kosuke Kaito, Kusatsu (JP); Yoshihide Kitamura, Kusatsu (JP)

(73) Assignee: KAIDO MANUFACTURING CO., LTD., Kusatsu (JP)

( * ) Notice: Subject to any disclaimer, the term of this patent is extended or adjusted under 35 U.S.C. 154(b) by 224 days.

(21) Appl. No.: 15/570,010

(22) PCT Filed: Jun. 15, 2016

(86) PCT No.: PCT/JP2016/067779
§ 371 (c)(1),
(2) Date: Oct. 27, 2017

(87) PCT Pub. No.: WO2017/022337
PCT Pub. Date: Feb. 9, 2017

(65) Prior Publication Data
US 2018/0158624 A1   Jun. 7, 2018

(30) Foreign Application Priority Data

Aug. 5, 2015  (JP) .............................. JP2015-155280

(51) Int. Cl.
*H01G 13/02*    (2006.01)
*H01G 9/145*    (2006.01)
(Continued)

(52) U.S. Cl.
CPC ............. *H01G 13/02* (2013.01); *B65H 18/10* (2013.01); *B65H 19/2223* (2013.01);
(Continued)

(58) Field of Classification Search
CPC ...... H01G 13/00; H01G 13/003; H01G 13/02; H01G 9/00; H01G 9/145; H01G 11/84;
(Continued)

(56) References Cited

U.S. PATENT DOCUMENTS 4,117,579 A * 10/1978 Shaw .................... Y10T 29/435
29/25.42
5,157,820 A * 10/1992 Frederick ............ H01G 13/003
264/272.18
(Continued)

FOREIGN PATENT DOCUMENTS

JP        60-214519 A     10/1985
JP        06-196361 A      7/1994
(Continued)

OTHER PUBLICATIONS

Machine Translation of Japanese Patent Publication, JP 2007-335181, Jul. 2019. (Year: 2019).*
(Continued)

*Primary Examiner* — A. Dexter Tugbang
(74) *Attorney, Agent, or Firm* — Global IP Counselors, LLP

(57) ABSTRACT

A winder includes a winding mechanism, a chamber housing the winding mechanism, at least one vacuum pump, and a product case. The winding mechanism is configured to wind a belt-shaped raw film around a winding core. The belt-shaped raw film is composed of a plurality of electrodes and a plurality of separating films. The at least one vacuum pump is configured to suck air into the chamber. The product case is configured to house a plurality of winding products each formed by winding the raw film with use of the winding mechanism disposed in the chamber.

6 Claims, 16 Drawing Sheets

(51) Int. Cl.
*H01G 11/84* (2013.01)
*H01M 10/04* (2006.01)
*H01G 13/00* (2013.01)
*H01G 9/00* (2006.01)
*B65H 19/22* (2006.01)
*B65H 18/10* (2006.01)
*B65H 18/28* (2006.01)

(52) U.S. Cl.
CPC .............. *H01G 9/00* (2013.01); *H01G 9/145* (2013.01); *H01G 11/84* (2013.01); *H01G 13/00* (2013.01); *H01M 10/04* (2013.01); *B65H 18/103* (2013.01); *B65H 18/28* (2013.01); *B65H 2301/41424* (2013.01); *B65H 2301/414324* (2013.01); *B65H 2301/414326* (2013.01); *B65H 2406/31* (2013.01); *B65H 2408/231* (2013.01); *B65H 2801/72* (2013.01)

(58) Field of Classification Search
CPC ....... H01G 9/155; H01M 10/04; B65H 18/10; B65H 18/103; B65H 18/28; B65H 19/2223; B65H 2301/41424; B65H 2301/414324; B65H 2301/414326; B65H 2406/31; B65H 2408/231; B65H 2801/72; Y10T 29/43; Y10T 29/435
See application file for complete search history.

(56) References Cited

U.S. PATENT DOCUMENTS 6,562,513 B1 * 5/2003 Takeuchi ............... H01G 9/155
429/189
2001/0003605 A1 * 6/2001 Honda ................... H01G 13/00
427/404
2011/0091661 A1 * 4/2011 Ito ........................ H01G 13/00
427/576
2013/0027847 A1 * 1/2013 Aoyama ................ H01G 13/02
361/530
2015/0143680 A1 * 5/2015 Krug ..................... Y10T 29/43
29/25.41
2016/0254523 A1   9/2016 Tsukui et al.

FOREIGN PATENT DOCUMENTS

| JP | 2001191014 A | * | 7/2001 |
| JP | 2004306571 A | * | 11/2004 |
| JP | 2007-142351 A | | 6/2007 |
| JP | 2007-335181 A | | 12/2007 |
| JP | 2008-251189 A | | 10/2008 |
| WO | 2015-056583 A1 | | 4/2015 |

OTHER PUBLICATIONS

The extended European search report for the corresponding European application No. 16832616.3, dated Nov. 9, 2018.
International Search Report of the corresponding International Application No. PCT/JP2016/067779, dated Sep. 13, 2016.
Notification of Reasons for Refusal of the corresponding Japanese application No. 2016-544168, dated Sep. 6, 2016.
Decision to Grant a Patent of the corresponding Japanese application No. 2016-544168, dated Jan. 25, 2017.

* cited by examiner

PRIOR ART

PRIOR ART

WINDER

CROSS-REFERENCE TO RELATED APPLICATION

This application is a U.S. National stage application of International application No. PCT/JP2016/067779, filed on Jun. 15, 2016, which claims priority to Japanese Patent Application No. 2015-155280 filed on Aug. 5, 2015. The entire disclosure of Japanese Patent Application No. 2015-155280 is incorporated by reference herein.

BACKGROUND

Field of the Invention

The present invention relates to a winder configured to produce a winding product for forming a battery or a capacitor.

Background Information

A battery has been produced by winding a belt-shaped raw film (which includes a plurality of separating films, a positive electrode, and a negative electrode) on a winding core, immersing a roll having been wound in an electrolytic solution, and injecting the electrolytic solution into a gap between each separating film and each of the positive electrode and the negative electrode.

In FIG. 14, reference numeral 120 is a winder which includes separating films 200, 202 fed from rolled raw films 210, 212, 214, 216, and a winding mechanism 122 for winding a positive electrode 204 and a negative electrode 206 on a winding core 108. In addition, the positions of the rolled raw films 214 and 216 may be opposite to each other in FIG. 14. As shown in FIG. 14, in this winder 120, a roll is formed by winding a separating film 200 in a position S1 and a winding product is formed by a winding stop of a tape 124 on an outer periphery of the roll in a position S2, and the winding product can be extracted in a position S3.

In the position S1, as shown in FIG. 15 (b), in the winder 120, tips of the separating films 200 and 202 are sandwiched by a gap 113 in a state in which a winding core 108 having the gap 113 shown in FIG. 15 (a) is attached to a rotating jig to rotate the winding core 108 more than once. Subsequently, a positive electrode 204 is each formed on an outer circumferential surface of the separating film 200 and an inner circumferential surface of the separating film 202. A negative electrode 206 is each formed on an outer circumferential surface of the separating film 202 and an inner circumferential surface of the separating film 200. As a result, the winding core 108 is rotationally driven to form a roll.

After the formation of the roll in the position S1, the separating film 200 is cut by a cutter not shown. The winding core 108 for supporting the roll and the roll are fed to the position S2 to be rotationally driven in a state in which the tape 124 is overlapped on the outer periphery of the roll. Next, the tape 124 is cut by a cutter not shown to form a winding product 109 shown in FIG. 15 (c). Subsequently, the winding core 108 is taken out of the winding product 109 in the position S3.

The winding product 109 is carried in the next process. In the next process, the winding product 109 is put in a battery can 130 shown in FIG. 16 and an electrolytic solution is injected from a side of an opening (from upward) of the battery can 130 into a gap between each separating film and each of the positive and negative electrodes.

However, air around the roll has entered the gap between the separating film 200 and the positive electrode 204. This forms wrinkles on the winding product 109 and excess current is generated in the produced battery. In this case, work to remove air in the gap from other portion of the opening is needed at the same time when injecting the electrolytic solution into the gap from a portion of the opening. Accordingly, the work to inject the electrolytic solution into the gap was troublesome and needed a number of man-hours. In addition, when there is air in the gap between the separating film 200 and the positive electrode 204, this produces wrinkles on the separating film 200.

A patent application of the invention relating to technology for injecting an electrolytic solution into a gap between each separating film and each of a positive electrode and a negative electrode to produce a battery or a capacitor has been filed (Japanese Patent Application Publication No. 2008-251189 A). However, there are no patent applications relating to the present invention.

SUMMARY

It is an object of the present invention to provide a winder capable of easily and quickly inject an electrolytic solution into a gap between each of a plurality of separating films and each of a positive electrode and a negative electrode to produce a battery or a capacitor and preventing wrinkles from being formed on the plurality of separating films.

In a first preferred aspect, there is provided a winder according to the present invention which includes: a winding mechanism configured to wind a belt-shaped raw film around a winding core, the belt-shaped raw film being composed of a plurality of electrodes and a plurality of separating films; a chamber where the winding mechanism is housed; and at least one vacuum pump to suck air in the chamber.

In a second preferred aspect, the winder according to the present invention further includes a product case to house a plurality of winding products each formed by winding the raw film with use of the winding mechanism provided in the chamber.

In a third preferred aspect, the winder according to the present invention further includes a conveying route having a sealed outer space outside the chamber, in which an inner space of the chamber leads to the outer space, and a product case to house a plurality of winding products each formed by winding the raw film with use of the winding mechanism provided in the conveying route.

In a fourth preferred aspect, the winder according to the present invention further includes a winding product carrier configured to feed the plurality of winding products from the winding mechanism to the product case.

In a fifth preferred aspect of the winder according to the present invention, the product case includes a vessel containing an electrolytic solution to immerse the plurality of winding products to be housed.

In a sixth preferred aspect of the winder according to the present invention, the product case houses the plurality of winding products.

In a seventh preferred aspect, the winder according to the present invention further includes at least two vacuum pumps each sucking air in the chamber.

In an eighth preferred aspect, there is provided a method for winding a belt-shaped raw film around a winding core with use of a winding mechanism, the belt-shaped raw film being composed of a plurality of electrodes and a plurality of separating films, which includes the steps of: setting a chamber where the winding mechanism is housed at vacuum pressure; and winding the raw film with use of the winding mechanism in the chamber set at vacuum pressure.

According to the winder of the present invention, it is possible to reduce air pressure inside the chamber to a low pressure, such as 1 Pa to 1,000 Pa with a vacuum pump. As a result, a winding product can be formed by winding a raw film into a roll under low pressure inside the chamber with use of a winding mechanism. Accordingly, a gap between each separating film of the formed winding product and each electrode is in a vacuum state. The winding product can be conveyed to a later process in a vacuum state between the raw film and the other raw film by seal-packaging the winding product or by sealing both ends of the winding product with a film.

In the later process, the winding product is put in a battery can and an electrolytic solution is poured into an opening of the battery can, for example, with an inlet of an electrolytic solution vessel closely brought into contact with the whole opening of the battery can. As a result, the electrolytic solution naturally enters a gap that is in a vacuum state between each separating film and each electrode. This enables easy and quick work to pour the electrolytic solution into the gap between each separating film and each electrode to produce a battery or a capacitor. In addition, according to the winder of the present invention, to perform winding of a plurality of separating films and the electrodes under a vacuum environment, no air enters a gap between each separating film and a positive electrode, resulting in no wrinkles formed on the plurality of separating films.

BRIEF DESCRIPTION OF THE DRAWINGS

Referring now to the attached drawings which form a part of this original disclosure.

FIG. 6 (b) is a front view of the important part of the winder further enlarged;

FIG. 15 (b) is a front view illustrating a state in which a raw film is wound around a winding core; and FIG. 15 (c) is a front view of a produced winding product.

DETAILED DESCRIPTION OF THE EMBODIMENTS

Figure 1:
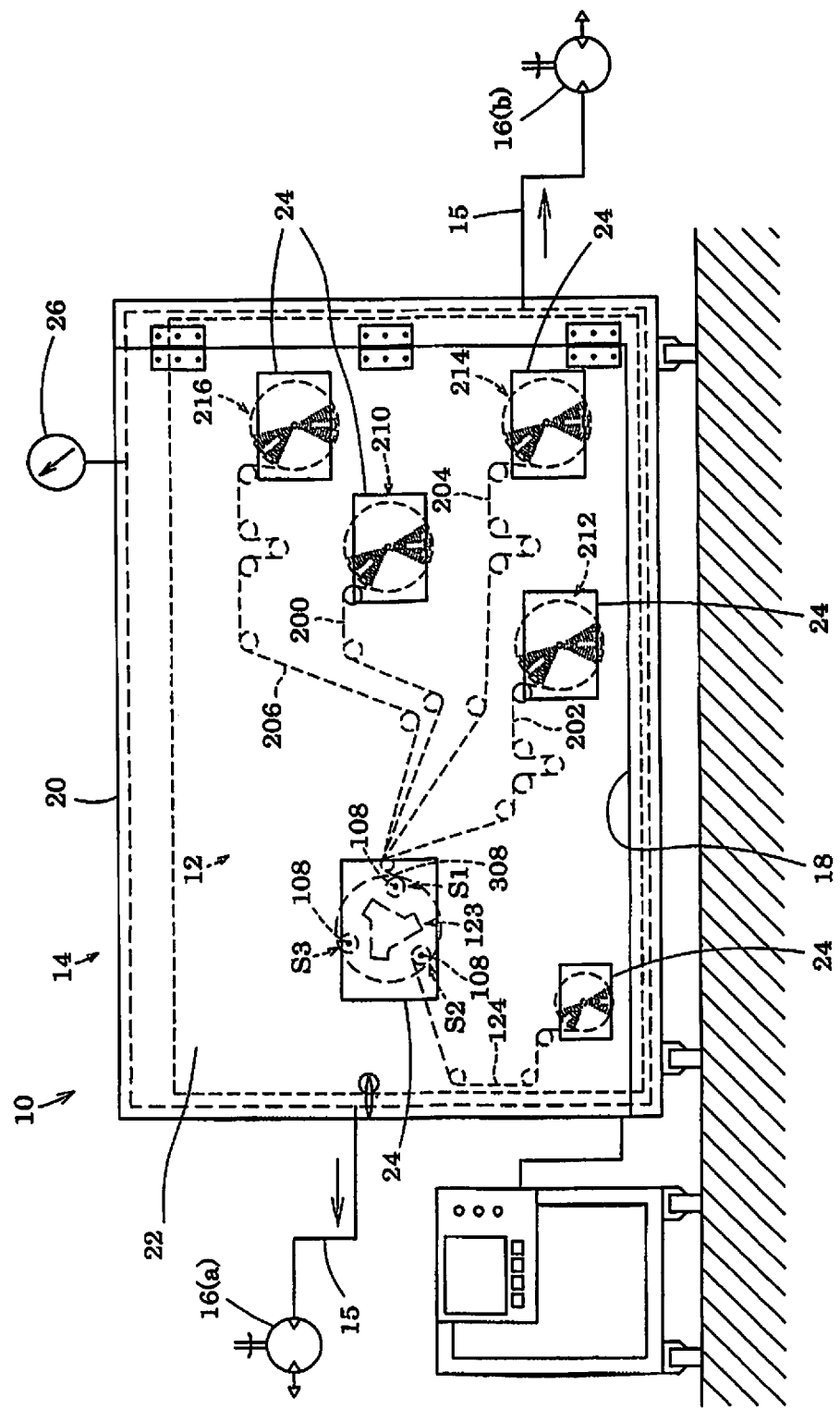
FIG. 1 is a front view of a winder of the present invention.

Embodiments of a winder of the present invention will now be described in accordance with drawings. In FIG. 1, reference numeral 10 is a winder of the present invention.

Figure 14:
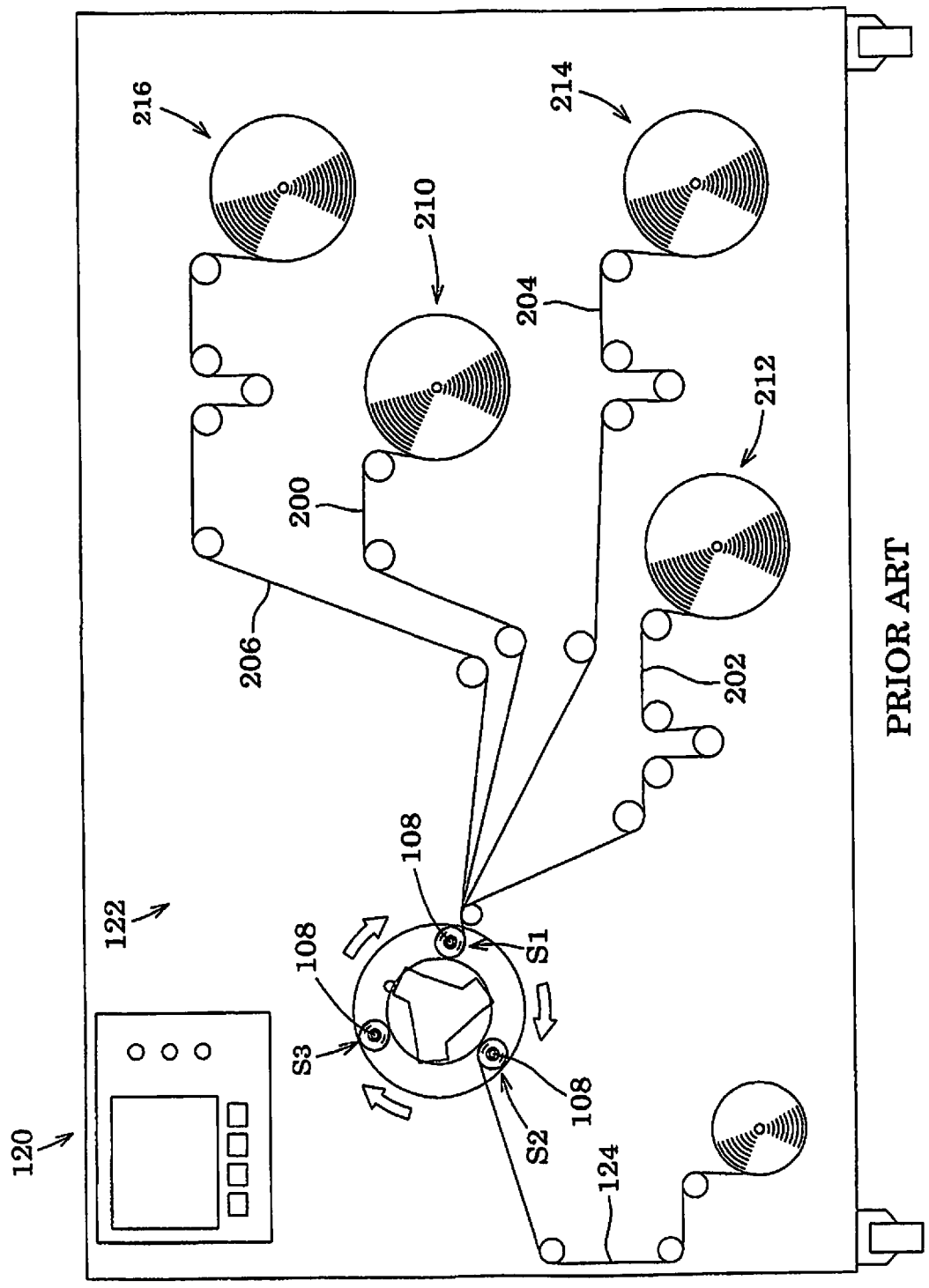
FIG. 14 is a front view of a conventional winder.

A winder 10 is an apparatus including a winding mechanism 12 configured to wind a raw film 308 (composed of separating films 200 and 202, a positive electrode 204, and a negative electrode 206) around a winding core 108. The winder 10 includes the winding mechanism 12, a chamber 14 where the winding mechanism 12 is housed, and vacuum pumps 16 (a) and 16 (b) to suck air in the chamber 14. The winding mechanism 12 has the same configuration as a conventional winding mechanism 122 shown in FIG. 14.

The chamber 14 includes a box 20 having an opening 18, a door 22 to open and close the opening 18, and a plurality of windows 24 provided on the door 22. A rolled raw film 210 is visible from the plurality of windows 24. The chamber 14 is equipped with a vacuum gauge 26 to measure air pressure inside the chamber 14. A sealing member not shown to seal the chamber 14 is provided in the opening 18 and the door 22 when necessary.

The vacuum pumps 16 (a) and 16 (b) are each connected to the chamber 14 by a pipe line 15 and a motor not shown is rotationally driven to reduce pressure inside the chamber 14. A vacuum flange to seal a connection part is each preferably provided in the connection part between the pipe line connected to the vacuum pumps 16 (a) and 16 (b) and the chamber 14. When starting reducing the pressure inside the chamber 14, to expedite reducing the pressure to predetermined pressure, both of the vacuum pumps 16 (a) and 16 (b) are caused to operate and only the vacuum pump 16 (a) that is one of the vacuum pumps 16 (a) and 16 (b) is caused to operate after reducing the pressure to the predetermined pressure.

Working and advantages of the winder 10 in such a configuration will now be described as below.

Initial Setting

First, the door 22 is opened and a tip of each of the separating films 200 and 202 is attached to the winding core 108 in the position S1 in FIG. 1. Subsequently, the winding core 108 is rotated clockwise more than once. After the separating films 200 and 202 have been wound clockwise, a positive electrode 204 is each formed on an outer circumferential surface of the separating film 200 and an inner circumferential surface of the separating film 202. A negative electrode 206 is each formed on an outer circumferential surface of the separating film 202 and an inner circumferential surface of the separating film 200. When the pressure inside the chamber 14 rises higher than a predetermined value, a vacuum pump 302 may be driven so that the pressure inside the chamber 14 may be the predetermined value in accordance with a signal of the vacuum gauge 26.

Next, the door 22 is shut and the opening 18 is tightly sealed. Motors for two vacuum pumps 16 (a) and 16 (b) are rotationally driven to reduce the pressure inside the chamber 14. When the pressure inside the chamber 14 is reduced to 1 Pa to 100 Pa, only a motor of one vacuum pump 16 (a) is rotationally driven and the other vacuum pump 16 (b) stops.

When the pressure inside the chamber 14 rises over 1 Pa to 100 Pa with use of a control system, the vacuum pump 16 (a) is driven so that the pressure inside the chamber 14 may be 1 Pa to 100 Pa in accordance with the signal of the vacuum gauge 26.

Formation of Winding Product

In a state where the pressure inside the chamber 14 is maintained at about 100 Pa, the winding core 108 is rotationally driven and the separating film 200 is wound around the winding core 108. The separating film 200 is cut by a cutter not shown to form a roll after the winding core 108 stops.

Figure 15:
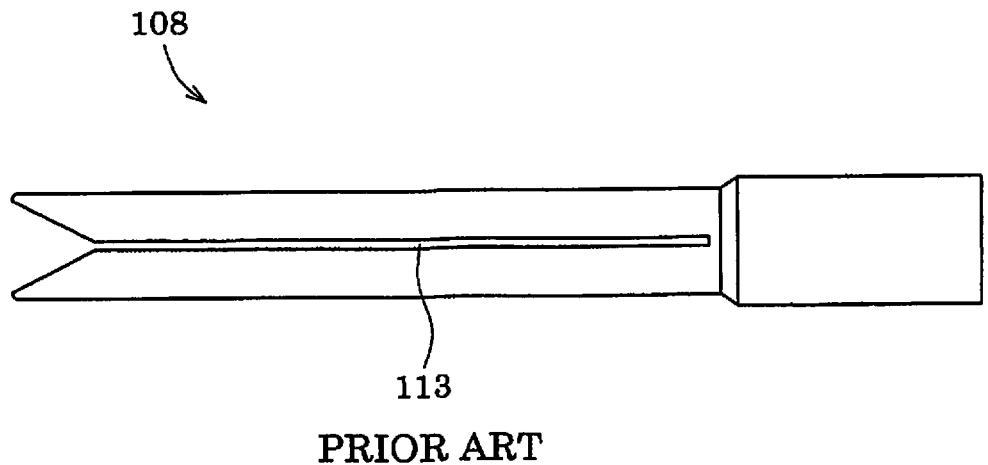
FIG. 15 (a) is a side view of a conventional winding core.
Figure 15:
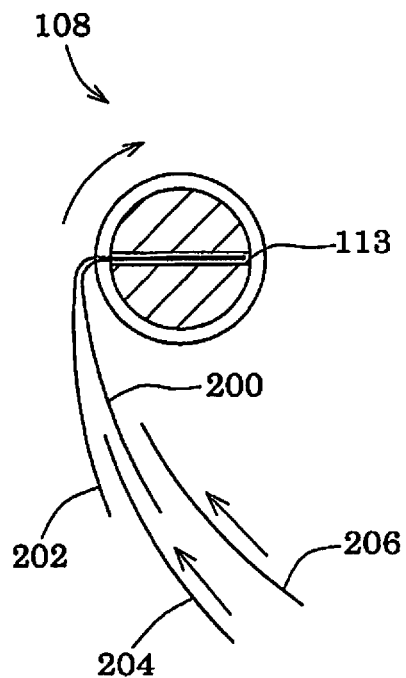
Figure 15:
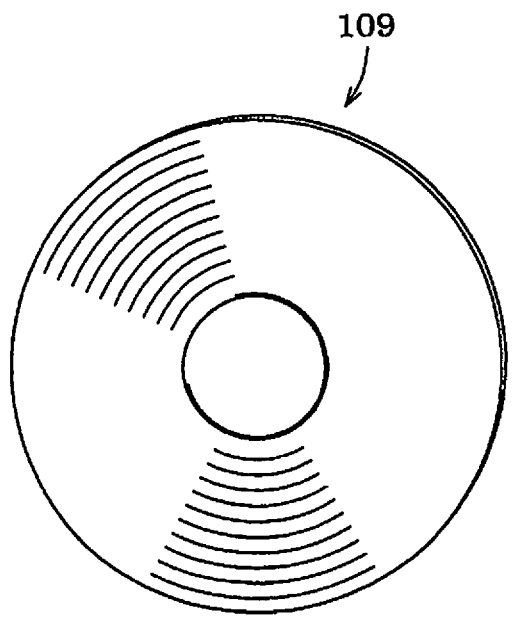
Figure 16:
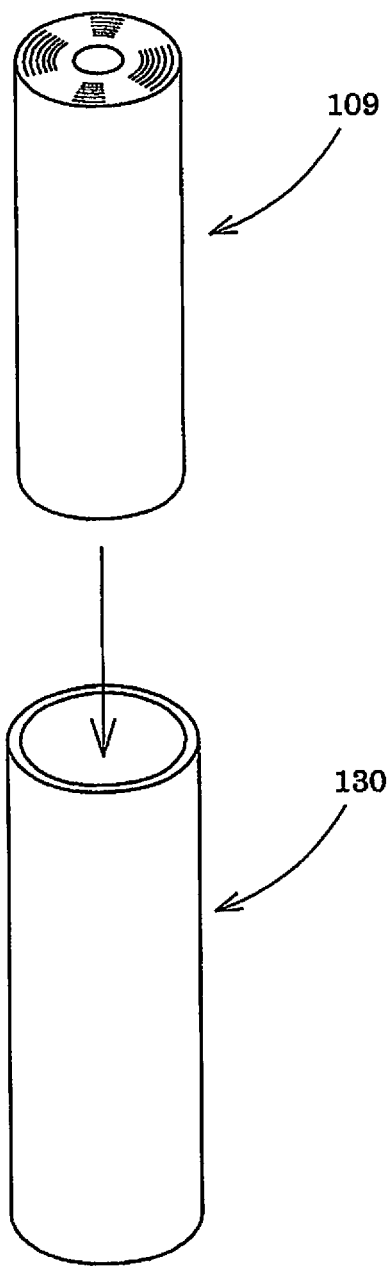
FIG. 16 is a perspective view illustrating a state in which a battery is produced by a winding product.

Next, a turret 123 is rotated clockwise and the roll formed in the position S1 is fed to the position S2 shown in FIG. 1. In the position S2, the winding core 108 is rotationally driven in a state in which a tape 124 is overlapped on the outer periphery of the roll. This makes the tape 124 wound on the roll and the tape 124 is cut by a cutter not shown. An adhesive layer is formed on the tape 124. Alternatively, an adhesive is coated on the tape 124. Each winding product 109 as shown in FIG. 15 (c) and FIG. 16 is formed.

As mentioned above, a winding product is formed in the chamber 14 where the pressure is reduced to about 100 Pa.

Advantages of the Present Invention

According to the winder 10 of the present invention, a gap between each separating film for a plurality of winding products 109 and each electrode formed in the chamber 14 where the pressure is reduced is in a vacuum state. The plurality of winding products 109 can be conveyed to a later process in a vacuum state between each separating film and each electrode by seal-packaging the winding products 109 or by sealing each both ends of the winding products 109 with a film.

In the later process, for example, the plurality of winding products 109 are put in a battery can without exposing to air while crushing a package in an opening of the battery can with the sealed-packaged winding products 109 pressed against the opening of the battery can. The opening is once tightly sealed with a film. Subsequently, for example, an inlet port of an electrolytic solution vessel is brought in contact with the whole opening of the battery can. Then the film is crushed in the opening to pour an electrolytic solution into the opening of the battery can. The electrolytic solution naturally enters the gap that is in the vacuum state between each separating film and each electrode. This makes it possible to easily and quickly pour the electrolytic solution into the gap between each separating film and each electrode to produce a battery or a capacitor.

According to the winder 10 of the present invention, dust in the chamber 14 can be pumped out of the chamber 14 by sucking air in the chamber 14 with the vacuum pump 16 (a). In addition, in the chamber 14 where air pressure is low (about 100 Pa), even light dust drops on the bottom of the chamber 14. As a result, dust does not adhere to the raw film wound in the chamber 14. This can improve quality of the plurality of winding products to be produced.

While an embodiment of the present invention has been described so far in accordance with the drawings, the present invention is not limited to this.

Figure 2:
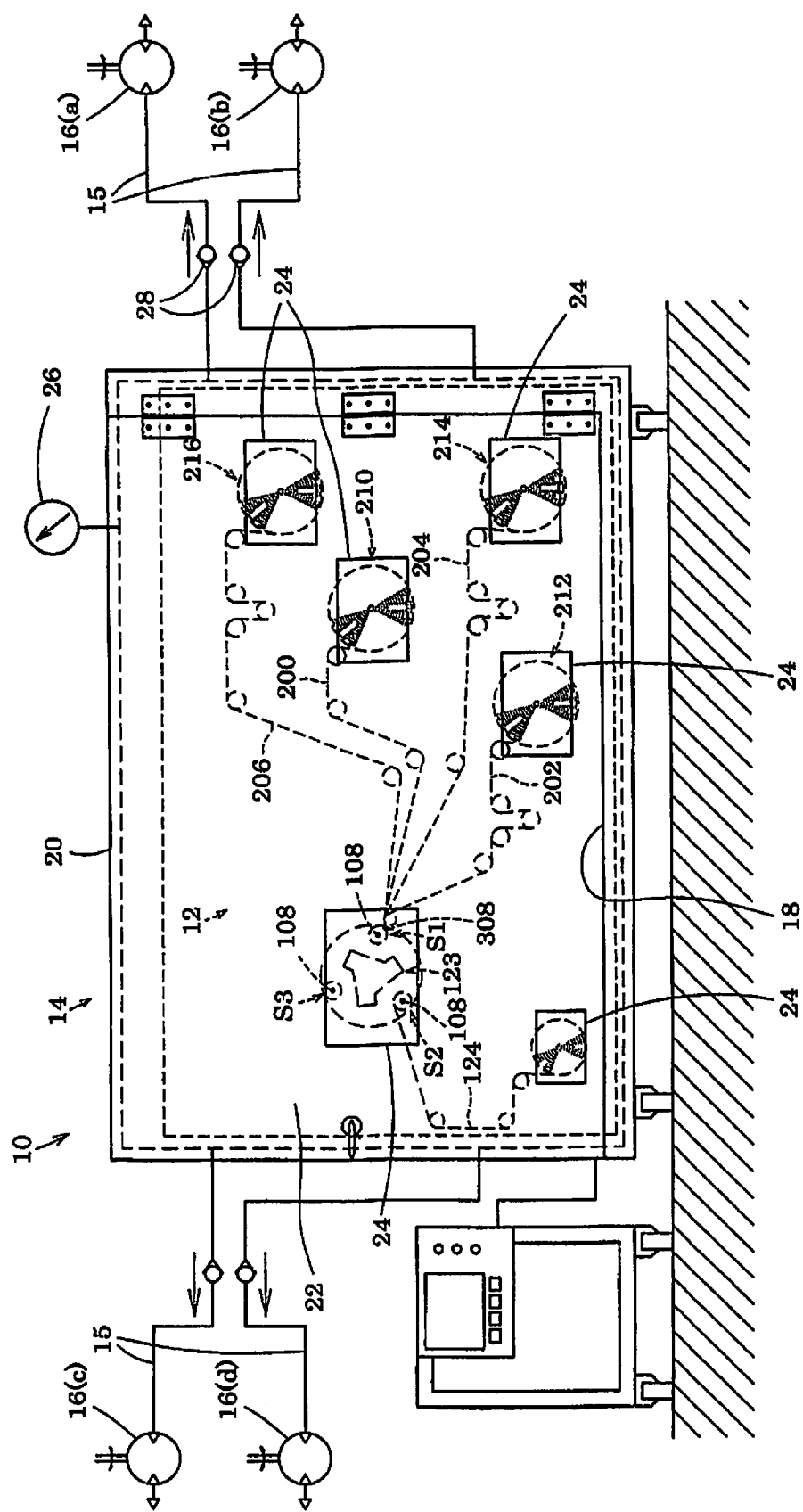
FIG. 2 is a front view of a winder in another embodiment of the present invention.

For example, the present invention may be a winder 10 shown in FIG. 2.

The winder 10 shown in FIG. 2 has the same configuration as in the winder 10 shown in FIG. 1 except that the winder 10 shown in FIG. 2 includes four vacuum pumps 16 (a), 16 (b), 16 (c), 16 (d), and a plurality of back-flow prevention valves 28 to prevent a back-flow of each vacuum pump.

The vacuum pump 16 (a) sucks air from the right upper part of the chamber 14 in FIG. 2 and the vacuum pump 16 (b) sucks air from the right lower part of the chamber 14 in FIG. 2. The vacuum pump 16 (c) sucks air from the left upper part of the chamber 14 in FIG. 2 and the vacuum pump 16 (d) sucks air from the left lower part of the chamber 14 in FIG. 2.

The winder 10 shown in FIG. 2 winds a raw film while sucking air from the right upper part, the right lower part, the left upper part, and the left lower part of the chamber 14 in FIG. 2 with use of the four vacuum pumps 16 (a), 16 (b), 16 (c), and 16 (d). As a result, the raw film can be wound while sucking dust out from the entire chamber 14. This leads to prevent dust from adhering to the entire raw film to be wound in the chamber 14, resulting in further improvement of the quality of the winding products to be produced. In addition, the winder 10 includes the plurality of back-flow prevention valves 28 and thus preventing dust from counter flowing into the chamber 14.

Figure 3:
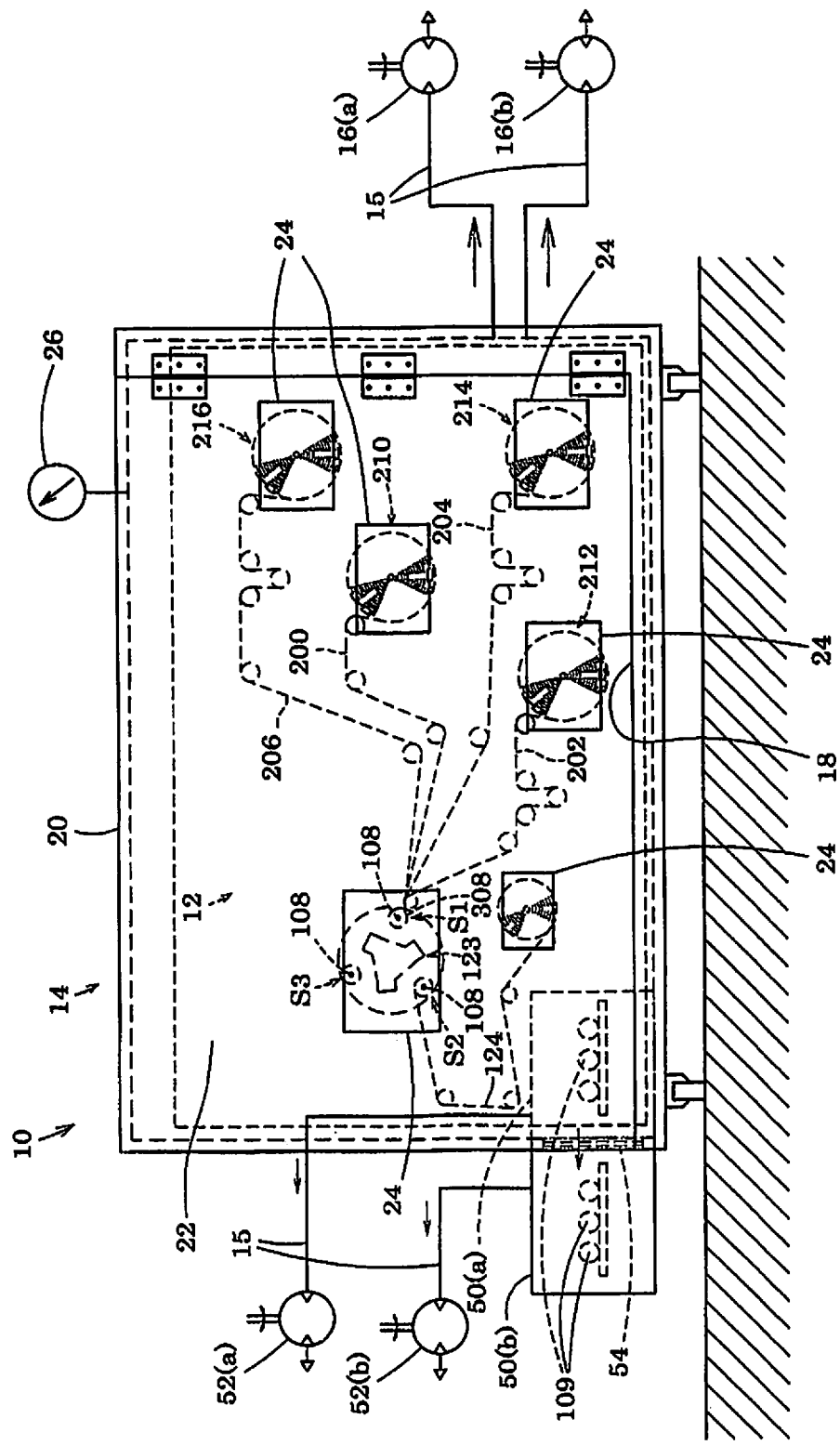
FIG. 3 is a front view of a winder in still another embodiment of the present invention.

In the present invention, as shown in FIG. 3, the winder 10 may include a chamber 50 (a) provided in a take-out part of a plurality of winding products in the chamber 14, a chamber 50 (b) provided adjacent to the chamber 50 (a) outside the chamber 14, a vacuum pump 52 (a) to introduce air from the chamber 50 (a), a vacuum pump 52 (b) to introduce air from the chamber 50 (b), and a door 54 disposed between the chamber 50 (a) and the chamber 50 (b).

In this case, after producing the plurality of winding products 109, air is introduced from the chamber 50 (a) by operating the vacuum pump 52 (a) with the door 54 closed to put the winding products 109 in the chamber 50 (a). Subsequently, air is introduced from the chamber 50 (b) by operating the vacuum pump 52 (b). Subsequently, the winding products 109 are moved into the chamber 50 (b) with the door 54 opened, leading to close the door 54. This makes it possible to take the winding products 109 out of the winder 10 while keeping the circumference of each of the winding products 109 in the vacuum state.

Figure 4:
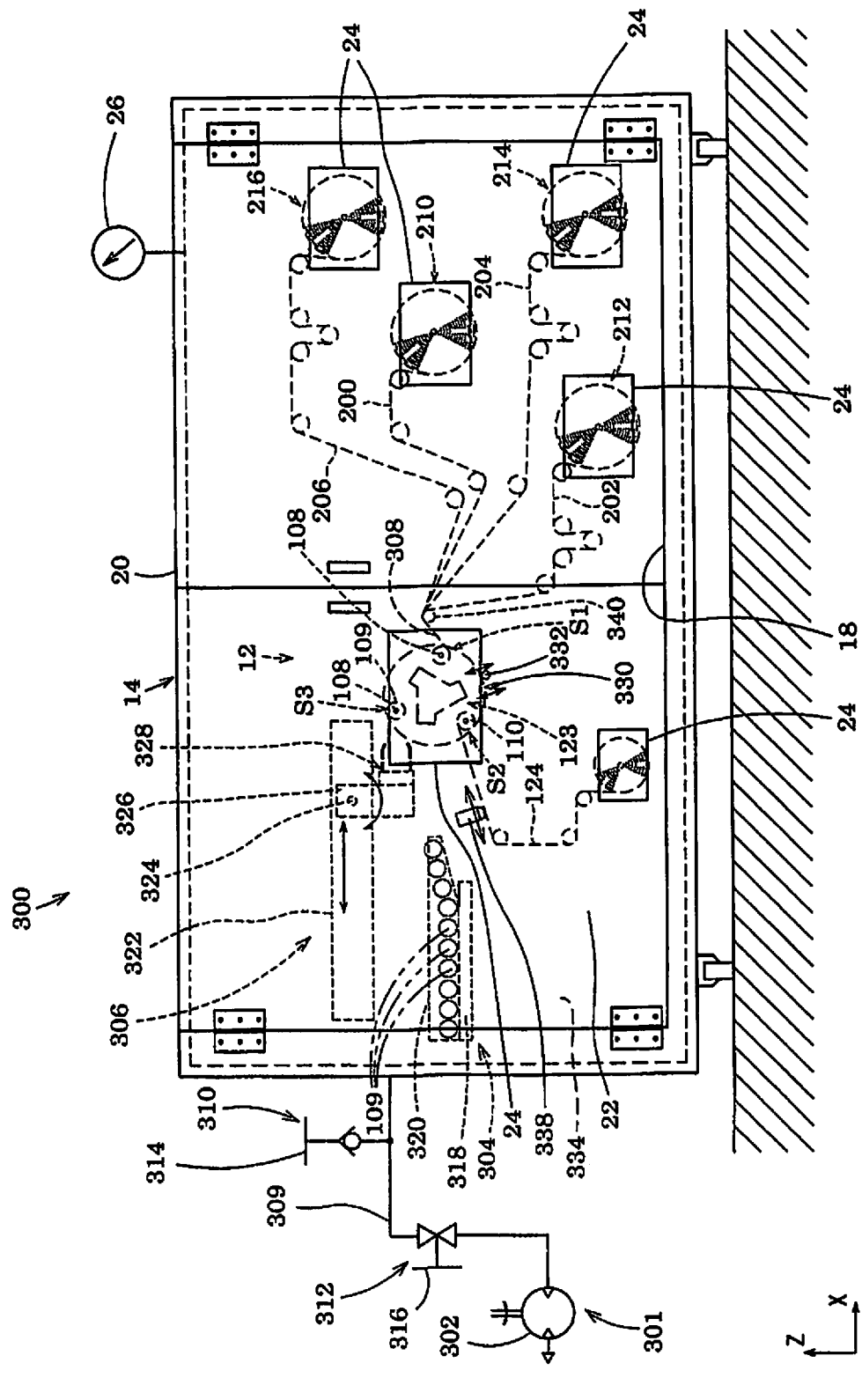
FIG. 4 is a front view of a winder in a further embodiment of the present invention.

The present invention may also be a winder 300 shown in FIG. 4. The winder 300 includes a winding mechanism 12, a chamber 14 where the winding mechanism 12 is housed, and a vacuum device 301 configured to suck air in the chamber 14. The winder 300 includes a product case 304 to house a plurality of winding products 109 formed by winding a raw film 308 with the winding mechanism 12, and a winding product carrier 306 configured to feed the plurality of winding products 109 from the winding mechanism 12 to the product case 304.

Winding Mechanism

Figure 6:
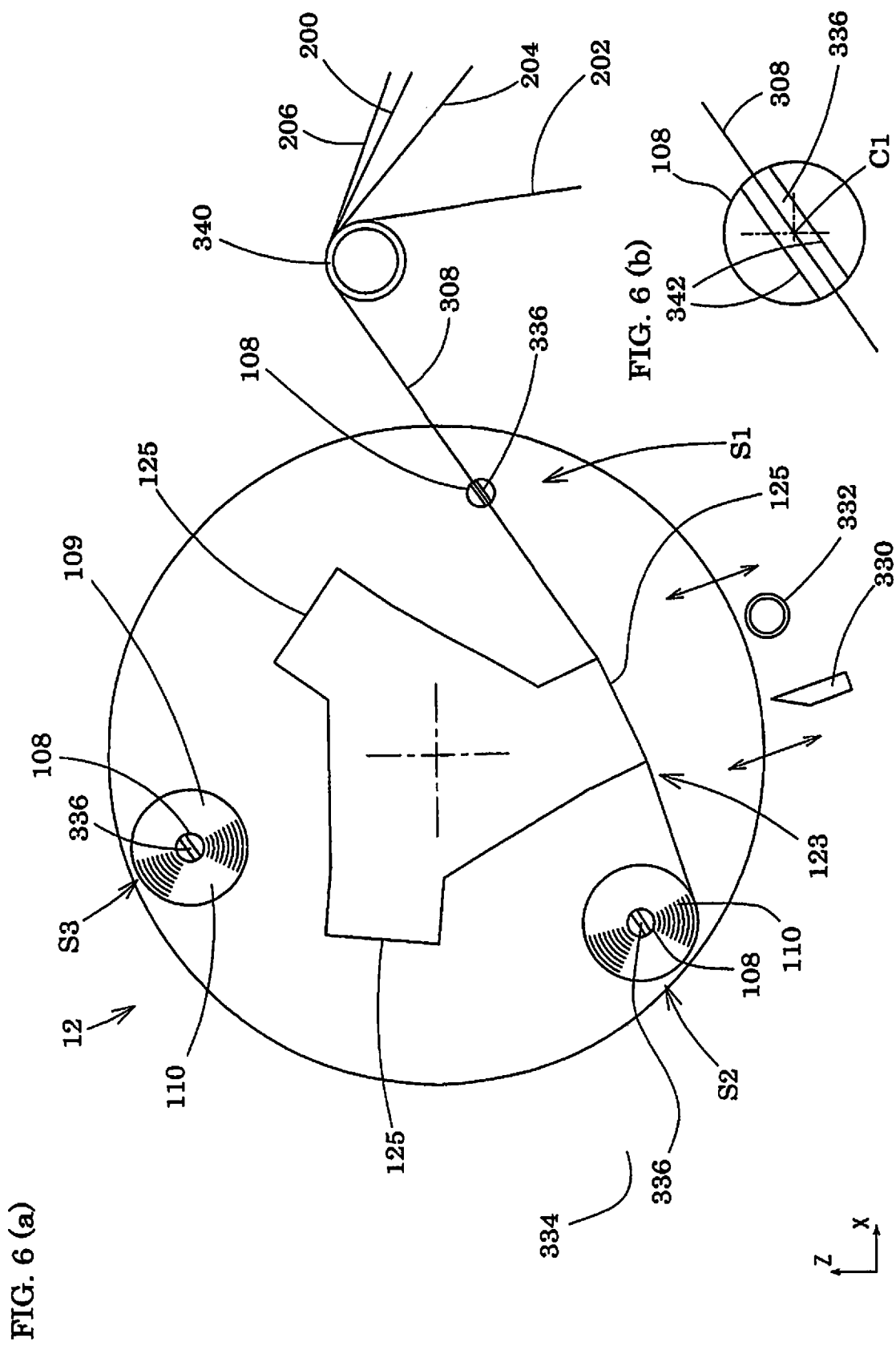
FIG. 6 (a) is a front view of an enlarged important part of the winder shown in FIG. 4.

As shown in FIG. 6 (a), the winding mechanism 12 of the winder 300 is separable or accessible with respect to an outer circumferential surface 125 of a turret 123 and includes a cutter 330 to cut the raw film 308 (composed of separating films 200 and 202, a positive electrode 204 and a negative electrode 206) that is in contact with the outer circumferential surface 125. And the winding mechanism 12 of the winder 300 is separable or accessible with respect to the outer circumferential surface 125 and includes a pressing roller 332 to press the raw film 308 that is in contact with the outer circumferential surface 125 when cutting the raw film 308.

A plurality of winding cores 108 in the winding mechanism 12 are movable in a vertical direction (hereinafter referred to as "Y-axis direction") to a substrate 334 of the winder 300 by a linear motor not shown. This enables the winding core 108 situated at the position S1 to evacuate in the opposite direction to a front direction (Y-axis direction) in FIG. 6 (a) when a roll 110 is formed to be moved to the position S2. At this time, the positions of a roller 340, the outer circumferential surface 125, and the winding core 108 are determined in such a manner that the raw film 308 put up by the roller 340 and the outer circumferential surface 125 may pass on a center line C1 of the winding core 108 situated at the position S1 (shown in FIG. 6 (b)). The winding core 108 has a groove 336 extending in a Y-axis direction. When the winding core 108 is evacuated in the opposite direction to the front direction in FIG. 6 (b), the rotation angle of the winding core 108 is controlled so that a corner part 342 of the groove 336 situated at the position S1 may be in parallel to the raw film 308 as shown in FIG. 6 (b). The rotation angle of the winding core 108 is controlled by a servomotor not shown.

This moves the winding core 108 in the front direction (Y-axis direction) in FIG. 6 (a). As a result, the raw film 308 is inserted into the groove 336. The groove 336 is separated from the raw film 308 by the movement of the winding core 108 in the direction opposite to the front direction. This enables to repeatedly perform automatic "formation of a second winding product" to be described later. The details will be described in "formation of a second winding product."

Figure 5:
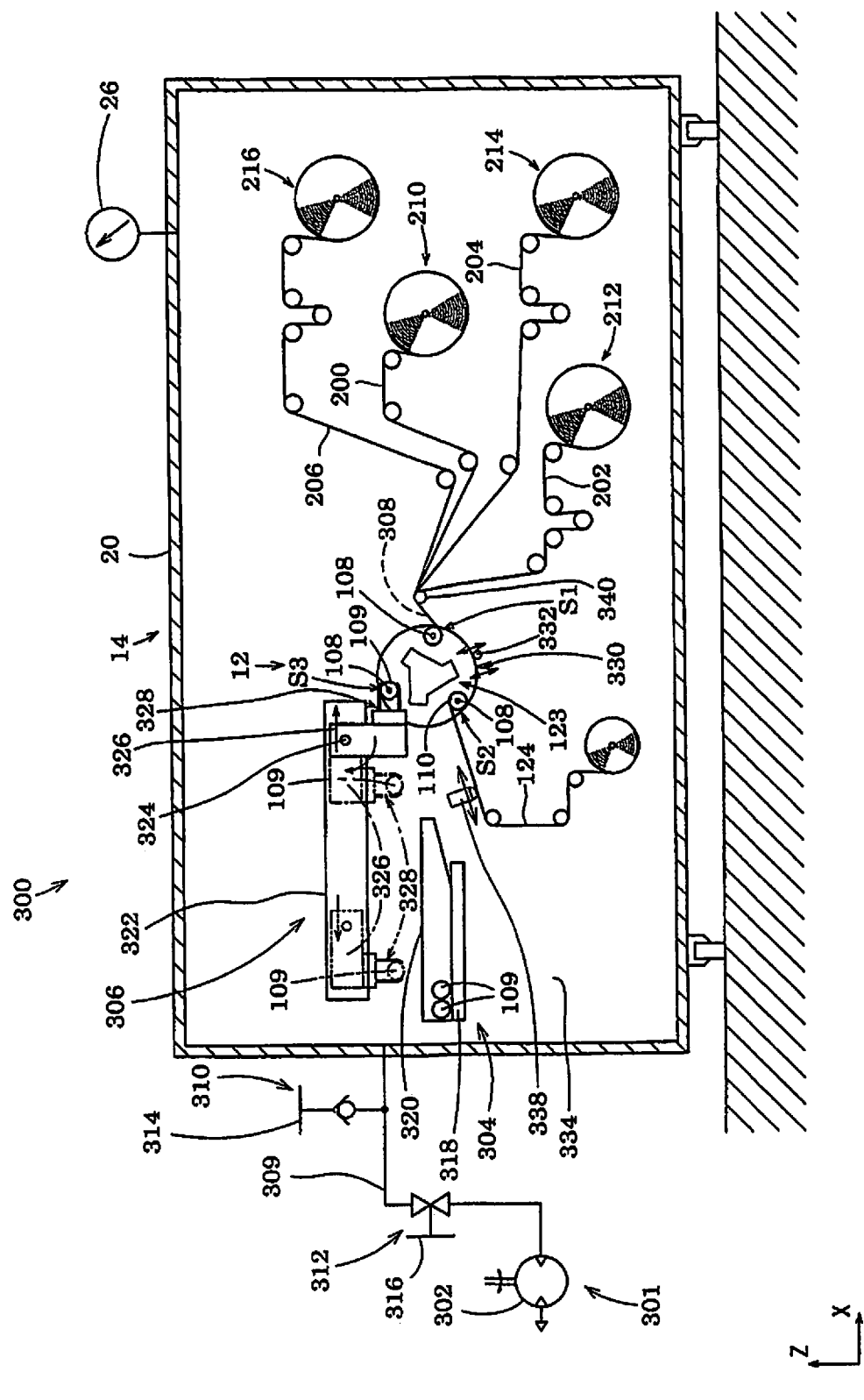
FIG. 5 is a front cross-sectional view illustrating a use state of the winder shown in FIG. 4.

As shown in FIGS. 4 and 5, an absorption nozzle 338 to separate or access from/to the roll 110 in the position S2 with a cylinder not shown is provided near the winding mechanism 12. The absorption nozzle 338 guides a tip of the tape 124 to the roll 110 in the position S2 to be attached to the outer circumferential surface of the roll 110. The tip of the tape 124 is fixed to the outer circumferential surface of the roll 110.

Chamber

The chamber 14 of the winder 300 has the same configuration as the chamber 14 of the winder 10 shown in FIG. 1.

Vacuum Device

The vacuum device 301 includes a vacuum pump 302. The vacuum pump 302 is connected to the chamber 14 via a pipe line 309 to rotationally drive a motor not shown. As a result, air pressure inside the chamber 14 can be reduced. A joint between the pipe line 309 and the chamber 14 preferably has a vacuum flange to seal the joint.

The pipe line 309 to connect between the vacuum pump 302 and the chamber 14 includes, as shown in FIG. 4, an air inflow valve 310 and a stop valve 312. When setting at atmospheric pressure inside the chamber 14 to open a door 22, the air inflow valve 310 allows air to enter the chamber 14. The air inflow valve 310 rotates a grip part 314 and thus allowing air to enter the pipe line 309.

When air enters the chamber 14 by operation of the air inflow valve 310, the stop valve 312 can prevent air from entering the vacuum pump 302 from the air inflow valve 310. The stop valve 312 can obstruct airflow from the air inflow valve 310 to the vacuum pump 302. In general, rotary blades that constitute a vacuum pump have a high strength relative to a tensile strength loaded in the opposite direction to the direction where air enters when sucking air. That is, the strength is set in view of the time when sucking air. On the other hand, the rotary blades each have a low strength relative to a suppress strength (generated by the entering of air at the time when air is not sucked) loaded in the opposite direction to the tensile strength. In other words, the strength is not set in view of the case of not sucking air. Consequently, the stop valve 312 is provided to prevent air from entering the vacuum pump 302 from the air inflow valve 310.

Product Case

As shown in FIG. 4, a product case 304 includes a fixing base 318 and a rack 320 mounted on the fixing base 318. The rack 320 can house a plurality of winding products 109. The rack 320 can be carried outside the chamber 14 by being separated from the fixing base 318.

Winding Product Carrier

As shown in FIG. 4, a winding product carrier 306 includes a rail 322 fixed such that the longitudinal direction thereof is set to be a horizontal direction (hereinafter referred to as "X-axis direction"), a moving member 326 to rotate around a rotational central axis 324 as well as reciprocation in an X-axis direction along the rail 322, and a seizing chuck 328 mounted on the moving member 326. The moving member 326 moves along the rail 322 by a ball screw mechanism not shown. The moving member 326 rotates around the rotational central axis 324 with a motor not shown. The seizing chuck 328 opens and closes with use of a solenoid mechanism not shown.

The winder 300 with such a configuration will now be described below. Operation of the winder 300 is described in chronological order, unless otherwise expressly described.

Initial Setting

The door 22 is opened and the rack 320 is mounted on the fixing base 318. In the position S1 in FIG. 5, each tip of the separating films 200 and 202 is attached to the winding core 108. Subsequently, the winding core 108 is rotated clockwise more than once and then the separating films 200 and 202 are wound clockwise. As a result, a positive electrode 204 is each formed on the outer circumferential surface of the separating film 200 and the inner circumferential surface of the separating film 202. A negative electrode 206 is each formed on the outer circumferential surface of the separating film 202 and the inner circumferential surface of the separating film 200.

Next, the door 22 is shut and the chamber 14 is tightly sealed. The air inflow valve 310 is closed so that air may not enter and the stop valve 312 is open so that air may enter inside the pipe line 309. The motor included in the vacuum pump 302 is rotationally driven to reduce the pressure inside the chamber 14. The pressure inside the chamber 14 is preferably 1 Pa to 100 Pa. The pressure inside the chamber 14 is maintained at about 1 Pa to 100 Pa by controlling the number of rotations of the motor for the vacuum pump 302 while the operator is looking at a vacuum gauge 26. When the pressure inside the chamber 14 rises higher than a predetermined value, the winder 300 may include a control system configured to drive the vacuum pump 302 so that the pressure inside the chamber 14 may be the predetermined value in accordance with signals of the vacuum gauge 26.

Formation of a First Winding Product

In the position S1, the winding core 108 is rotationally driven and the raw film 308 is wound around the winding core 108. Next, the turret 123 is rotated clockwise and the roll 110 formed in the position S1 is fed to the position S2 shown in FIG. 6 (a). At this time, the winding core 108 having moved to the position S1 by the clockwise rotation is evacuated in the opposite direction to the front direction (Y-axis direction) in FIGS. 5 and 6 (a). As shown in FIG. 6 (b), the raw film 308 put up by a roller 340 and the outer circumferential surface 125 passes on the central line C1 of the winding core 108 that has been evacuated in the position S1.

The winding core 108 being evacuated moves in the front direction in FIG. 6 (a). The raw film 308 is inserted into the groove 336 of the winding core 108 situated at the position S1. The pressing roller 332 moves toward the turret 123 and the raw film 308 is pressed against the outer circumferential surface 125. The cutter 330 moves toward the turret 123 to cut the raw film 308 that is being pressed against the outer circumferential surface 125. The cutter 330 is separated from the outer circumferential surface 125. And the pressing roller 332 keeps the state of pressing the raw film 308.

In the position S2, the winding core 108 is rotationally driven in the state in which the tape 124 is overlapped on the outer periphery of the roll 110. As a result, the tape 124 is wound around the roll to be cut by a cutter not shown and thus forming a winding product 109 as shown in FIG. 15 (a) and FIG. 16.

Housing of a First Winding Product

When a first winding product 109 is formed, the moving member 326 moves from the original position (the position of the moving member 326 in FIG. 4) to an X-axis positive direction. As indicated by a solid line in FIG. 5, the seizing chuck 328 is closed to grip the winding product 109. As indicated by a chain line in FIG. 5, the moving member 326 rotates clockwise by 90°, setting the rotational central axis 324 as a center. The gripped winding product 109 rotates clockwise by 90°, setting the rotational central axis 324 as a center.

As indicated by a double chain line in FIG. 5, the moving member 326 moves in an X-axis negative direction and the gripped winding product 109 moves in the X-axis negative direction. When the gripped winding product 109 is moved above the rack 320, the seizing chuck 328 is opened and the winding product 109 drops in the rack 320 to be housed. The moving member 326 returns to the original position.

Formation of a Second Winding Product

When the winding of the first roll 110 is finished, as mentioned in the item "Formation of a first winding product", the cutter 330 is separated from the outer circumferential surface and then the pressing roller 332 presses the raw film 308 against the outer circumferential surface 125 in the position S1 in FIG. 5. The winding core 108 situated at the position S1 has been evacuated in the opposite direction to the front direction in FIG. 5. The raw film 308 put up by the roller 340 and the outer circumferential surface 125 passes through the central line C1 of the winding core 108 being evacuated at the position S1.

The raw film 308 is inserted into the groove 336 of the winding core 108 situated at the position S1 by the movement of the winding core 108 in the front direction in FIG. 5.

In the position S1 in FIG. 5, the pressing roller 332 is separated from the raw film 308. The winding core 108 starts rotating at the moment when the pressing roller 332 has been separated from the raw film 308. This makes the raw film 308 wound around the winding core 108.

Housing of a Second Winding Product

A second winding product 109 is formed in the winding mechanism 12. Consequently, the second winding product 109 is housed in the rack 320 by the seizing chuck 328 in the same manner as described in the aforementioned "Housing of a first winding product."

Formation and Housing of a Plurality of Winding Products

A plurality of winding products 109 are housed in the rack 320 by repeating the aforementioned "Formation of a second winding product" and "Housing of a second winding product" more than once. To avoid the plurality of winding products 109 from dropping from the rack 320 in an overlapped state, the moving member 326 may alter the distance to move in the X-axis direction for each winding product 109 to house the winding products 109.

Extraction of a Plurality of Winding Products

The vacuum pump 302 stops. The stop valve 312 is closed so that air may not enter the vacuum pump 302 via the pipe line 309. The air inflow valve 310 is opened and air enters inside the chamber 14 via the air inflow valve 310. The pressure inside the chamber 14 becomes atmospheric pressure. The door 22 is opened and the rack 320 where the plurality of winding products 109 have been housed is extracted from the chamber 14.

Advantages of the Present Invention

According to the winder 300 of the present invention, the chamber 14 is tightly sealed in the aforementioned "Initial setting" and then the plurality of winding products 109 are formed in the chamber 14 without opening and closing the chamber 14 to be housed in the rack 320. Subsequently, the door 22 of the chamber 14 is opened to extract the plurality of winding products 109. As a result, it is not necessary to take one winding product 109 out of the chamber 14 every time one winding product 109 is formed. This eliminates the need for repeating the opening and closing of the door 22, operation and stop of the vacuum pump 302 to form the plurality of winding products 109. As a result, man-hours to form the plurality of winding products 109 in the vacuum environment are reduced.

Figure 7:
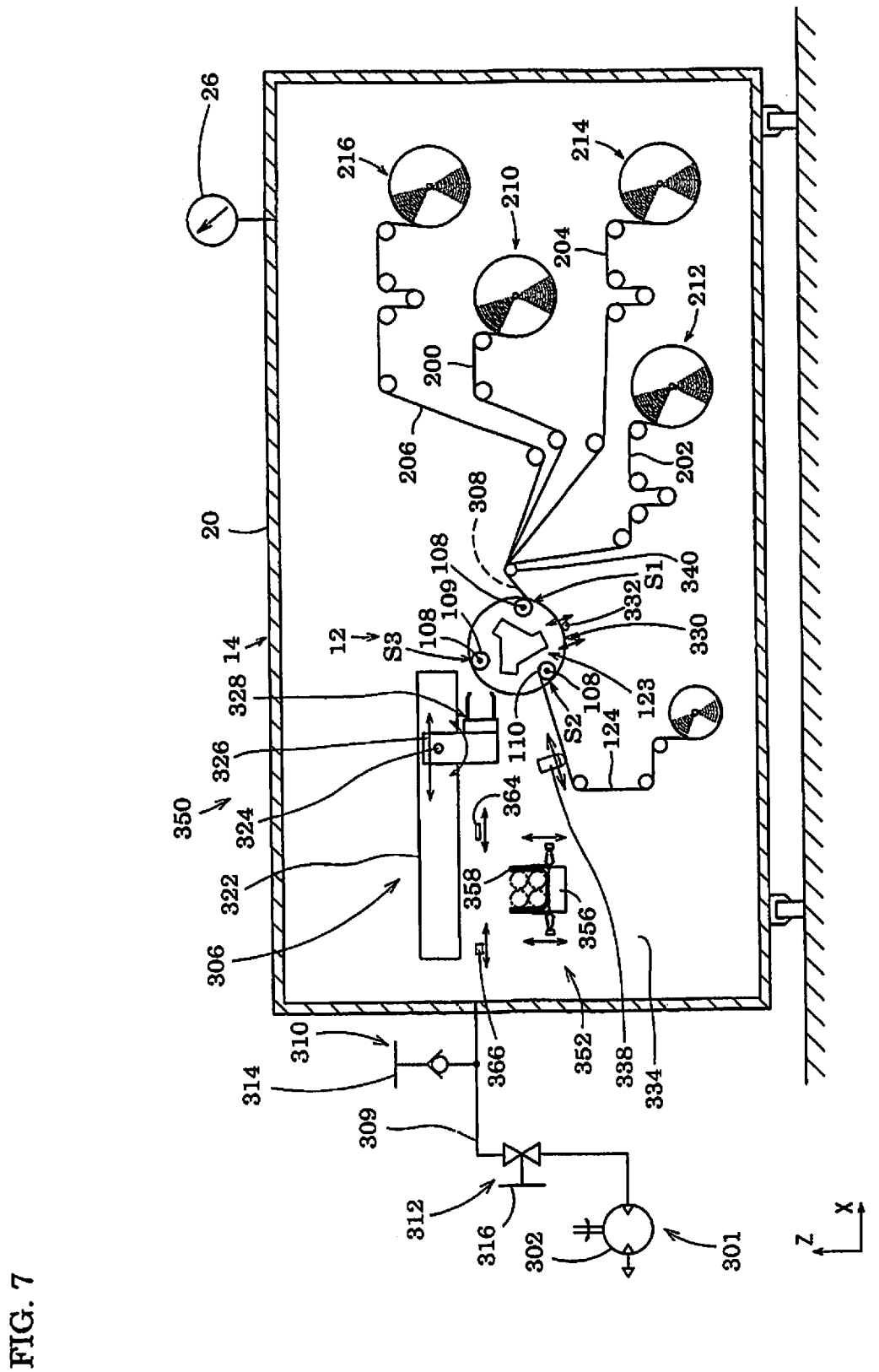
FIG. 7 is a front cross-sectional view in a still further embodiment of the present invention.

In addition, the present invention may be a winder 350 shown in FIG. 7. The winder 350 includes a winding mechanism 12, a chamber 14 where the winding mechanism 12 is housed, and a vacuum device 301 configured to suck air in the chamber 14. The winder 350 further includes a product case 352 to house a plurality of winding products 109 formed by winding a raw film with use of the winding mechanism 12, and a winding product carrier 306 configured to feed the plurality of winding products 109 from the winding mechanism 12 to the product case 352.

Each configuration of the winding mechanism 12, the chamber 14, the vacuum device 301, and the winding product carrier 306 in the winder 350 is the same as the configuration of the winder 300 shown in FIG. 4.

Product Case

Figure 8:
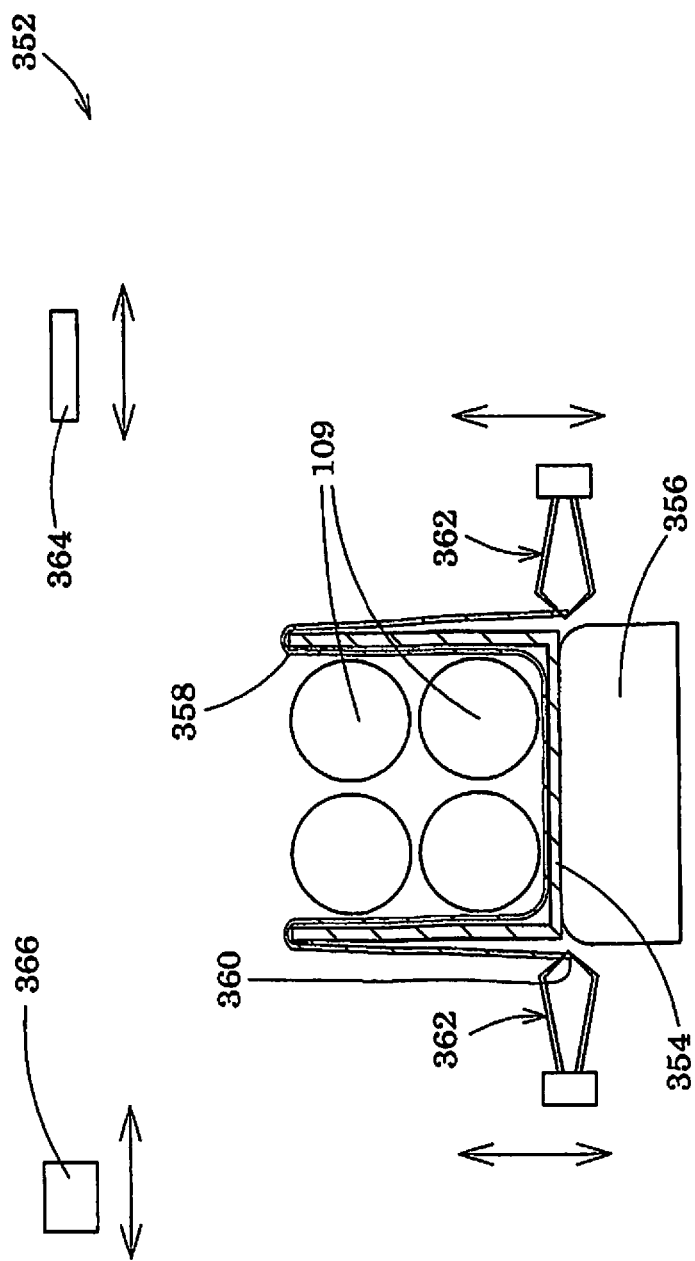
FIG. 8 is a front cross-sectional view of an enlarged important part of the winder shown in FIG. 7.
Figure 9:
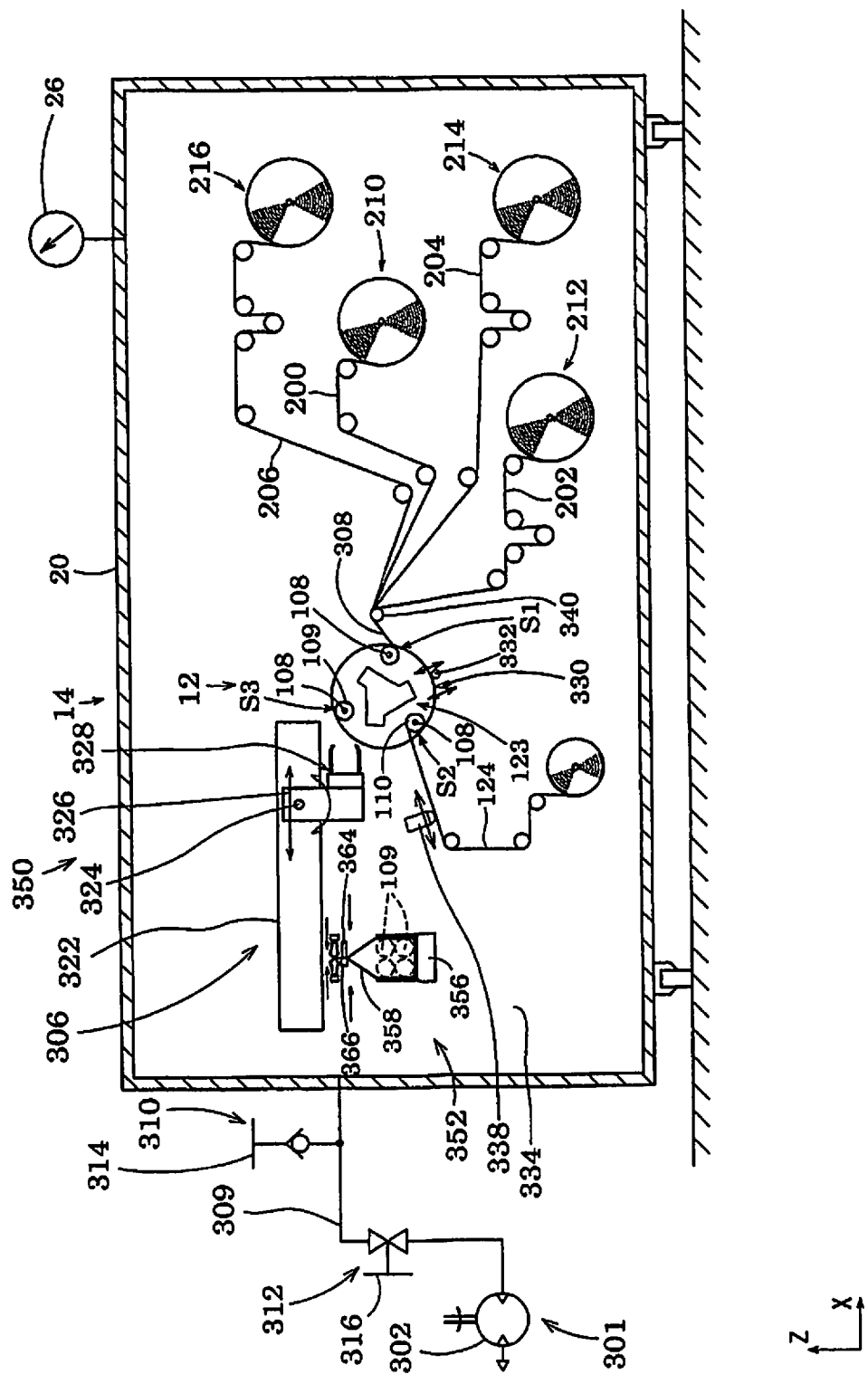
FIG. 9 is a front cross-sectional view illustrating a use state of the winder shown in FIG. 7.
Figure 10:
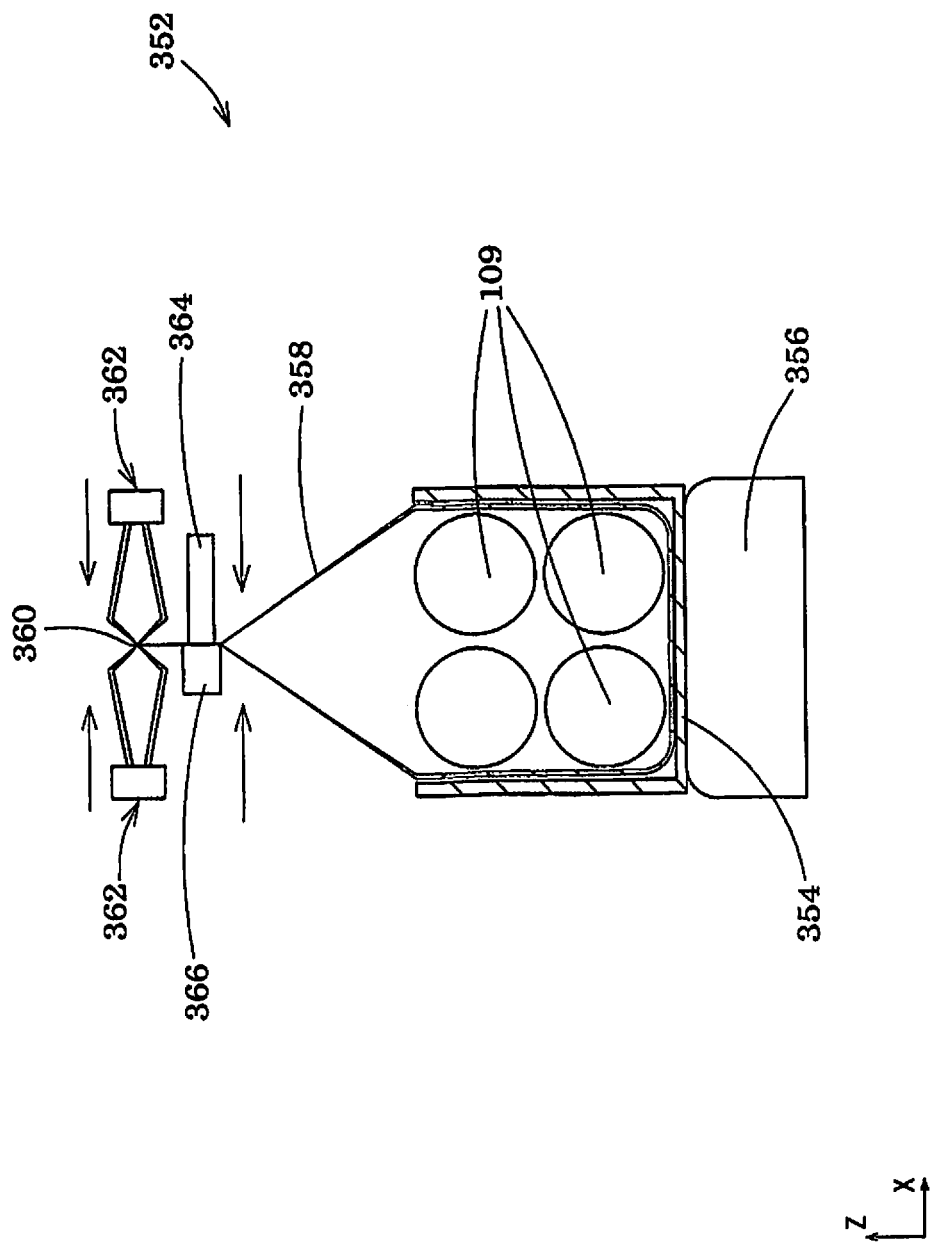
FIG. 10 is a front cross-sectional view of an enlarged important part of the winder shown in FIG. 7.

As shown in FIG. 8, the product case 352 includes a box 354, a base 356 to support the box 354, a bag 358 in which a center thereof is housed in the box 354, a plurality of clampers 362 to each clamp an opening end 360 of the bag 358, a welding jig 364, and a receiving member 366 to receive the welding jig 364. In FIG. 8 and FIG. 10, a cross-section end surface of each of the box 354 and the bag 358 is illustrated.

The bag 358 has a length of a Z-axis direction about twice as long as the length of a Z-axis direction of the box 354. As shown in FIG. 8, the central part of the bag 358 is pressed into the box 354 and the opening end 360 of the bag 358 is taken outside the box 354 to be pulled down. As a result, the opening end 360 can cover near the bottom of the box 354. The plurality of clampers 362 can reciprocate in the X-axis and the Z-axis directions. The welding jig 364 and the receiving member 366 can reciprocate in the Z-axis direction. The welding jig 364 and the receiving member 366 are separable and accessible to each other.

Operation of the winder 350 having such a configuration will be described as below. Unless otherwise expressly described herein, the operation will be described in chronological order.

Initial Setting

The door 22 is opened and the box 354 is put on the base 356. The center of the bag 358 is inserted into the box 354. A plurality of clampers 362 sandwich the opening end 360 of the bag 358.

In the position S1 in FIG. 7, the tip of the separating film 200 is attached to the winding core 108 in the same manner as in the winder 300 shown in FIG. 4. A positive electrode 204 is each formed on the outer circumferential surface of the separating film 200 and the inner circumferential surface of the separating film 202, and a negative electrode 206 is each formed on the outer circumferential surface of the separating film 202 and the inner circumferential surface of the separating film 200 in the same manner as in the winder 300 shown in FIG. 4. The door 22 is closed and the vacuum pump 302 is activated to keep the pressure inside the chamber 14 at about 1 Pa to 100 Pa in the same manner as in the winder 300 shown in FIG. 4.

Formation of a First Winding Product

A first winding product is formed in the same manner as in the winder 300 shown in FIG. 4.

Housing of a First Winding Product

A first winding product 109 is formed and then the seizing chuck 328 grips the winding product 109. The gripped winding product 109 rotates clockwise by 90°, setting the rotational central axis 324 as a center in the same manner as in the winder 300 shown in FIG. 4.

The moving member 326 moves in the X-axis negative direction and the gripped winding product 109 moves in the X-axis negative direction. When the gripped winding product 109 is moved to above the product case 352, the seizing chuck 328 is opened and the winding product 109 drops in the bag 358 in the product case 352 to be housed. The moving member 326 returns to the original position.

Formation of a Second Winding Product

The operation of forming a second winding product 109 is the same as the operation of the winder 300 shown in FIG. 4.

Housing of a Second Winding Product

In the winding mechanism 12, the second winding product 109 is formed and housed in the bag 358 by the seizing chuck 328 in the same manner as in the aforementioned "Housing of a first winding product."

Formation and Housing of a Plurality of Winding Products

A plurality of winding products 109 are housed in the bag 358 by repeating the aforementioned "Formation of a second winding product" and "Housing of a second winding product" more than once.

The plurality of winding products 109 are housed in the bag 358 and then a plurality of clampers 362 access and come in contact with each other after the plurality of clampers 362 move upward to a position higher than the height of the welding jig 364 and the receiving member 366. The heated welding jig 364 and the receiving member 366 access and come in contact with each other. This makes the opening end 360 of the bag 358 welded and tightly sealed. At this time, the inside of the bag 358 is in a vacuum state. This is because the bag 358 has been tightly sealed under a vacuum environment.

Extraction of a Plurality of Winding Products

The vacuum pump 302 is caused to stop and the stop valve 312 is closed, the air inflow valve 310 is opened, and the pressure inside the chamber 14 is set at atmospheric pressure in the same manner as in the winder 300 shown in FIG. 4. When the pressure inside the chamber 14 becomes atmospheric pressure, the bag 358 shrinks to come in contact with the plurality of winding products 109 in the bag 358. This is because the inside of the bag 358 is in the vacuum state. The bag 358 is extracted from the chamber 14 to extract the plurality of winding products 109 placed in the bag 358.

Advantages of the Present Invention

According to the winder 350 of the present invention, it is not needed to repeat opening and closing the door 22, activating and stopping the vacuum pump 302 so as to form a plurality of winding products 109 in the same manner as in the winder 300 shown in FIG. 4. As a result, man-hours to form the plurality of winding products 109 in a vacuum environment can be reduced. In addition, the plurality of winding products 109 housed in the vacuum-packed bag 358 can be taken out of the chamber 14 and thus preventing dust from entering the plurality of winding products 109 that have been taken out of the chamber 14.

Figure 11:
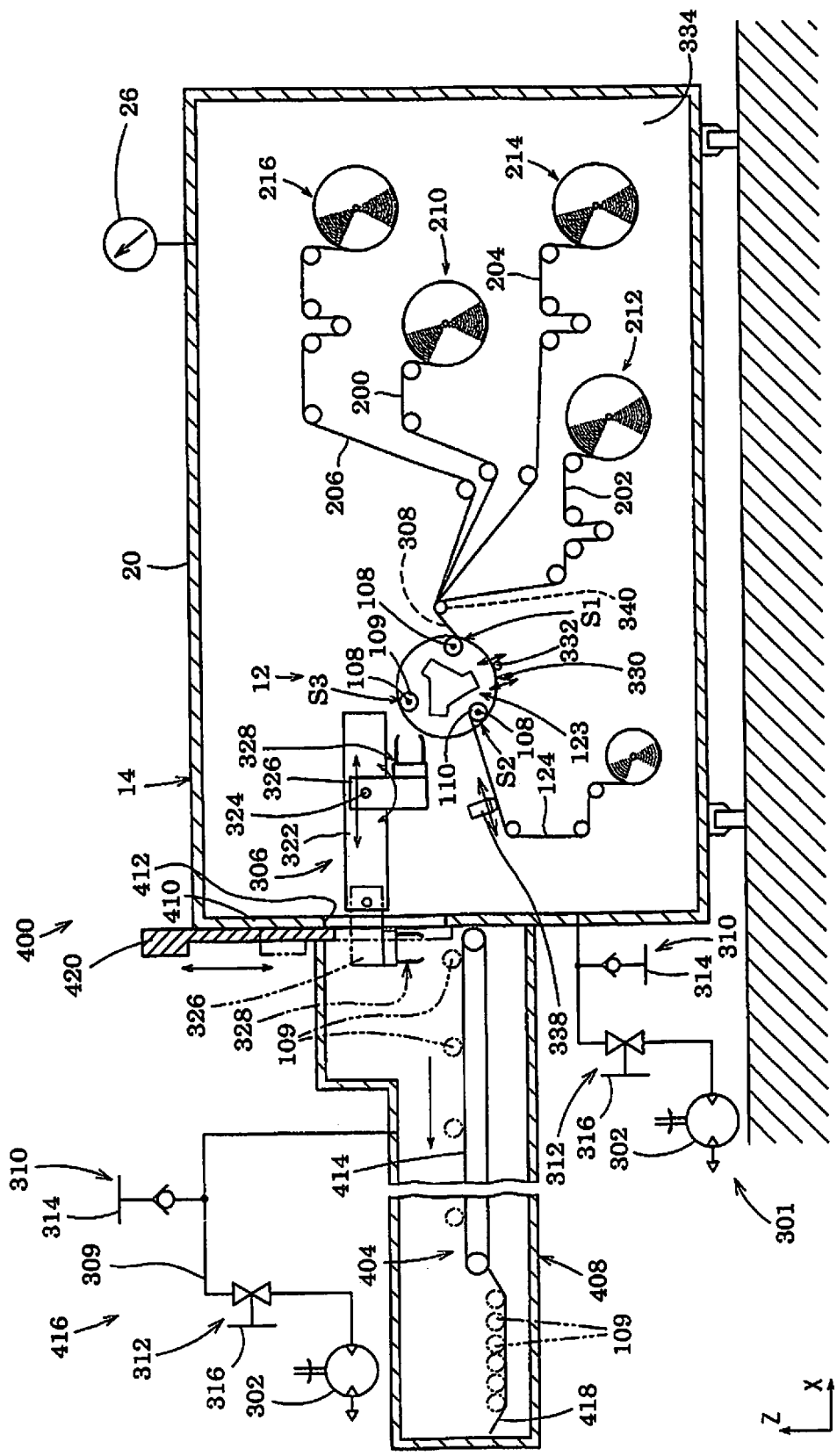
FIG. 11 is a front cross-sectional view of a winder in another embodiment of the present invention.

The present invention may also be a winder 400 shown in FIG. 11. The winder 400 includes a winding mechanism 12, a chamber 14, a vacuum device 301, and a conveying route 408 to lead to the chamber 14.

The winding mechanism 12, the vacuum device 301, and a winding product carrier 306 of the winder 400 are configured in the same manner as in the winder 300 shown in FIG. 4.

Chamber

The winding product carrier 306 configured to feed a plurality of winding products 109 formed by winding a raw film with use of the winding mechanism 12 from the winding mechanism 12 to a product case 404 is provided in the chamber 14. The chamber 14 has an opening 412 on a side wall 410 of a box 20. In the chamber 14, air can be sucked by the vacuum device 301.

Conveying Route

The product case 404 to house the plurality of winding products 109 is provided in the conveying route 408. Air inside the conveying route 408 can be sucked by a vacuum device 416. The vacuum device 416 is configured in the same manner as a vacuum device 301. The inner space of the chamber 14 leads to the tightly sealed outer space included in the conveying route 408 that is provided outside the chamber 14 via the opening 412. The opening 412 is openable and closable by moving a shutter 420 up and down.

Product Case

As shown in FIG. 11, the product case 404 includes a rack 418 to house the plurality of winding products 109, a conveyor 414 configured to feed the winding products 109 from the winding product carrier 306 to the rack 418. The conveyor 414 is situated at a position where the winding product carrier 306 moves the winding products 109 gripped by the seizing chuck 328 to the conveyor 414 via the opening 412. In addition, a door to extract the winding products 109 not shown is provided near the rack 418 in the conveying route 408.

Operation of the winder 400 with the aforementioned configuration will now be described as below. Unless otherwise expressly described, the operation of the winder 400 is described in chronological order.

Initial Setting

In the position S1 in FIG. 11, the operation of attaching the tip of the separating film 200 to the winding core 108 is the same as the operation of the winder 300 shown in FIG. 4. The operation of each forming a positive electrode 204 on the outer circumferential surface of the separating film 200 and on the inner circumferential surface of the separating film 202, and the operation of each forming a negative electrode 206 on the outer circumferential surface of the separating film 202 and on the inner circumferential surface of the separating film 200 are the same as the operations of the winder 300 shown in FIG. 4.

The shutter 420 is elevated to open the opening 412. The inner space of the chamber 14 leads to the outer space of the conveying route 408 via the opening 412. A plurality of vacuum pumps 302 in the chamber 14 and the conveying route 408 are activated and thus maintaining the pressure inside the chamber 14 and the conveying route 408 at about 1 Pa to 100 Pa. The operation of a plurality of air inflow valves 310 at the time when the pressure inside the chamber 14 and the conveying route 408 is maintained at about 1 Pa to 100 Pa is the same as the operation of the air inflow valve 310 in the winder 300 shown in FIG. 4.

Formation of a First Winding Product

In the winder 400, a first winding product is formed in the same manner as in the winder 300 shown in FIG. 4.

Housing of a First Winding Product

A first winding product 109 is formed and then the seizing chuck 328 grips the winding product 109. The gripped winding product 109 rotates clockwise by 90°, setting the rotational central axis 324 as a center in the same manner as in the winder 300 shown in FIG. 4.

The moving member 326 moves in the X-axis negative direction and the gripped winding product 109 moves in the X-axis negative direction. When the gripped winding product 109 is moved to above the conveyor 414 via the opening 412, the seizing chuck 328 is opened and the winding product 109 drops on the conveyor 414. The moving member 326 returns to the original position. The conveyor 414 works to convey the winding product 109 placed on the conveyor 414 to the rack 418 so as to house the winding product 109 in the rack 418.

Formation of a Second Winding Product

A second winding product 109 is formed in the same manner as in the winder 300 shown in FIG. 4.

Housing of a Second Winding Product

When the second winding product 109 is formed in the winding mechanism 12, the second winding product 109 is housed in the rack 418 by the winding product carrier 306 and the conveyor 414 in the same manner as in the aforementioned "Housing of a first winding product."

Formation and Housing of a Plurality of Winding Products

A plurality of winding products 109 are housed in the rack 418 by repeating the aforementioned "Formation of a second winding product" and "Housing of a second winding product" more than once. The prescribed number of winding products 109 are housed in the rack 418. As a result, the shutter 420 moves downward to close the opening 412.

Storage of a Plurality of Winding Products

The plurality of vacuum pumps 302 of the vacuum device 301 are stopped to close a plurality of stop valves 312. The plurality of air inflow valves 310 are opened to make the pressure inside the chamber 14 atmospheric pressure. The inside of the conveying route 408 is maintained in a vacuum state and a plurality of winding products 109 housed in the rack 418 are stored in a vacuum environment. The rack 418 is sealed with a tight lid to be removed and is fed to a later process.

Advantages of the Present Invention

According to the winder 400 of the present invention, like the winder 300 shown in FIG. 4, there is no need to repeat opening and closing the door 22 and activating and stopping the plurality of vacuum pumps 302 to form a plurality of winding products 109. This reduces man-hours for forming the plurality of winding products 109 in a vacuum environment. The conveying route 408 is extended to near an injection step to inject an electrolytic solution into each of the plurality of winding products 109 and the rack 418 is disposed near the injection step. This makes it possible to inject the electrolytic solution into the plurality of winding products 109 as soon as the winding products 109 have been taken out of the vacuum environment in the injection step. As a result, removal of air from the gap between each of the separating films of the winding products 109 to be injected and electrodes can surely be omitted.

Figure 12:
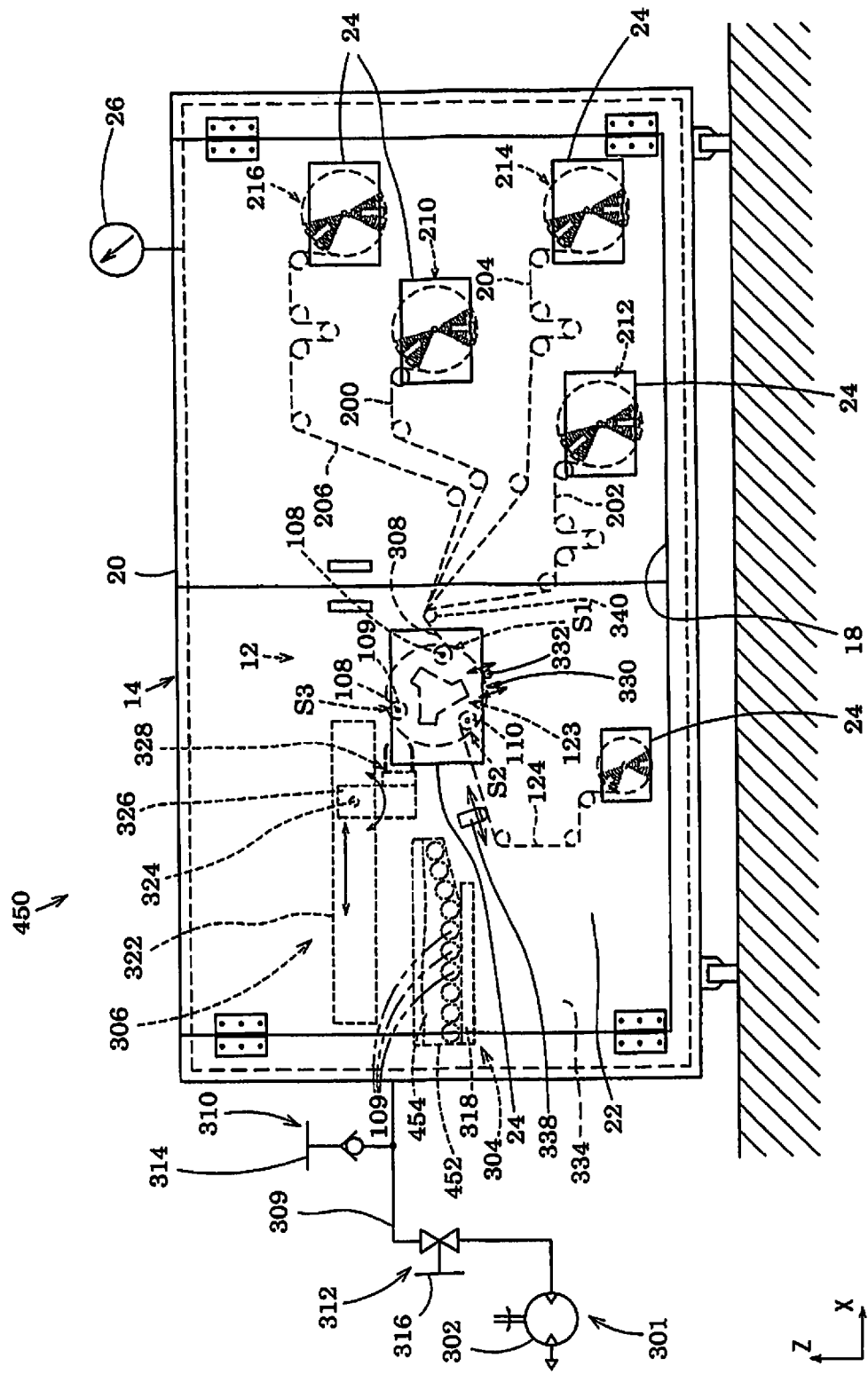
FIG. 12 is a front view of a winder in a still another embodiment of the present invention.

The present invention may also be a winder 450 shown in FIG. 12. The winder 450 includes a vessel 452 where a liquid can be kept as a substitute of the rack 320 included in the product case 304 of the winder 300 shown in FIG. 4. An electrolytic solution 454 is poured into the vessel 452. The vessel 452 has a depth enough to immerse the whole winding products 109. The configuration of the winder 450 is the same as the configuration of the winder 300 shown in FIG. 4 except that the winder 450 includes the vessel 452 into which the electrolytic solution 454 is poured.

Initial Setting

In the winder 450, the electrolytic solution 454 is poured into the vessel 452 in an initial setting. Other operations in the initial setting are the same as the operations of the winder 300 shown in FIG. 4.

Formation of a First Winding Product

A first winding product is formed in the same manner as in the winder 300 shown in FIG. 4.

Housing of a First Winding Product

A first winding product 109 is housed in the vessel 452. The whole first winding product 109 housed in the vessel 452 is immersed in the electrolytic solution 454 contained in the vessel 452. The other operations of the winder 450 are the same as the operations of the winder 300 shown in FIG. 4.

Formation of a Next Winding Product

A second winding product is formed in the same manner as in the winder 300 shown in FIG. 4.

Housing of a Second Winding Product

A next winding product 109 is housed in the vessel 452. The whole second winding product 109 housed in the vessel 452 is immersed in the electrolytic solution 454 contained in the vessel 452. The other operations of the winder 450 are the same as the operations of the winder 300 shown in FIG. 4.

Formation and Housing of a Plurality of Winding Products

A plurality of winding products 109 are housed in the vessel 452 by repeating the aforementioned "Formation of a second winding product" and "Housing of a second winding product" more than once. The whole plurality of winding products 109 housed in the vessel 452 are immersed in the electrolytic solution 454 contained in the vessel 452. The other operations of the winder 450 are the same as the operations of the winder 300 shown in FIG. 4.

Extraction of a Plurality of Winding Products

The pressure inside the chamber 14 becomes atmospheric pressure in the same manner as in the winder 300 shown in FIG. 4. This makes the periphery of the electrolytic solution 454 in the vessel 452 changed from the vacuum state to the atmospheric pressure state. This atmospheric pressure allows the electrolytic solution 454 to naturally enter the gap that is in the vacuum state between each of the separating films and each of the electrodes. The door 22 is opened to extract the vessel 452 where a plurality of winding products 109 are housed from the chamber 14.

Advantages of the Present Invention

According to the winder 450 of the present invention, like the winder 300 shown in FIG. 4, there is no need to repeat opening and closing the door 22 and activating and stopping a vacuum pump 302 to form a plurality of winding products 109. This reduces man-hours for forming the plurality of winding products 109 in the vacuum environment. In addition, when the winding products 109 are extracted, the pressure inside the chamber 14 becomes atmospheric pressure. This allows the electrolytic solution 454 to naturally enter the gap that is in the vacuum state between each of the separating films and each of the electrodes. As a result, the winder 450 can inject the electrolytic solution 454 into the winding products 109.

Figure 13:
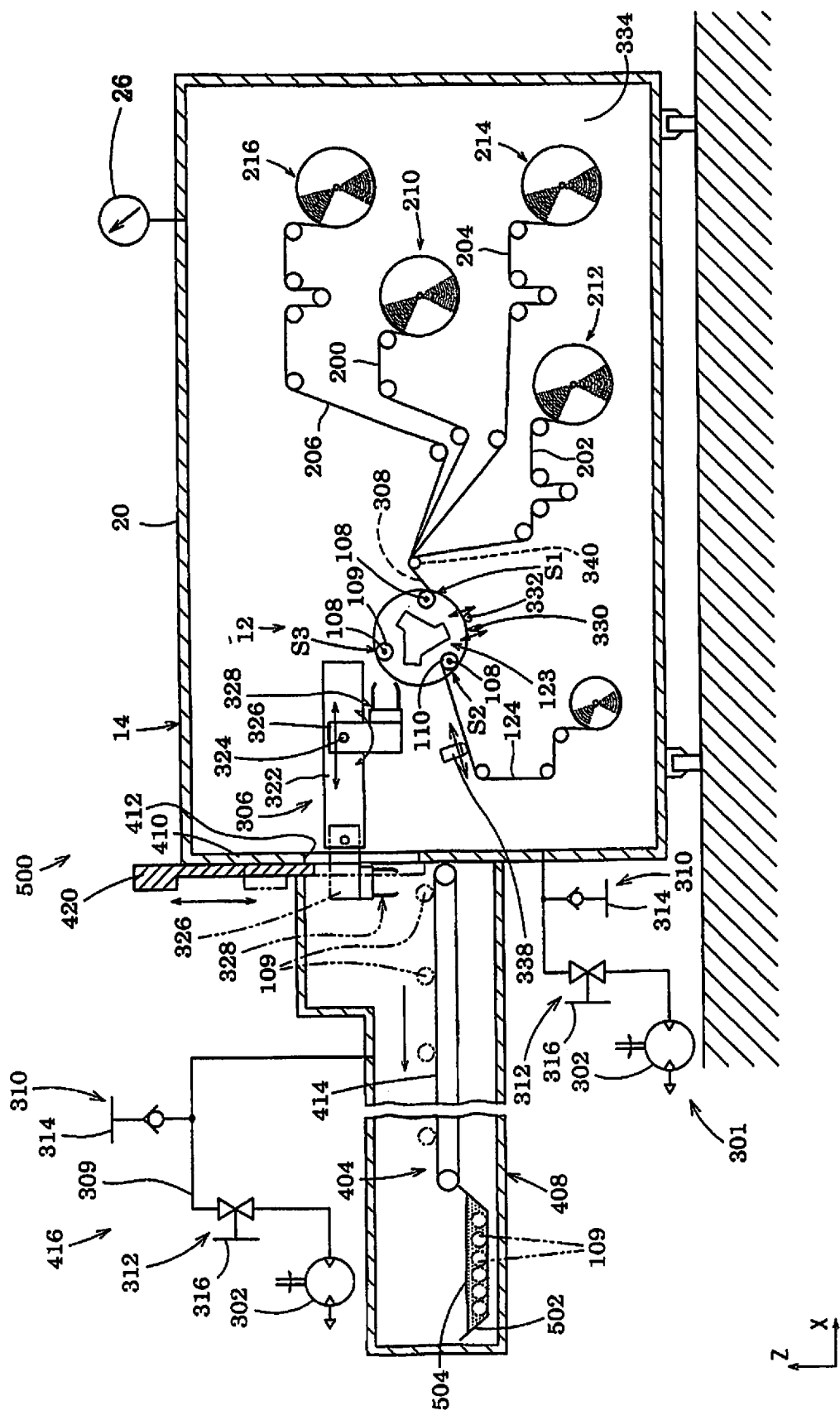
FIG. 13 is a front cross-sectional view in a further embodiment of the present invention.

The present invention may also be a winder 500 shown in FIG. 13. The winder 500 includes a vessel 502 where a liquid can be kept as a substitute of a rack 418 included in the product case 404 of the winder 400 shown in FIG. 11. An electrolytic solution 504 is poured into the vessel 502. The vessel 502 has a depth enough to immerse the whole winding products 109. The configuration of the winder 500 is the same as the configuration of the winder 400 shown in FIG. 11 except that the winder 500 includes the vessel 502 into which the electrolytic solution 504 is poured.

Initial Setting

In the winder 500, the electrolytic solution 504 is poured into the vessel 502 in an initial setting. Other operations in the initial setting are the same as the operations of the winder 400 shown in FIG. 11.

Formation of a First Winding Product

A first winding product is formed in the same manner as in the winder 400 shown in FIG. 11.

Housing of a First Winding Product

A first winding product 109 is housed in the vessel 502. The whole first winding product 109 housed in the vessel 502 is immersed in the electrolytic solution 504 contained in the vessel 502. The other operations of the winder 500 are the same as the operations of the winder 400 shown in FIG. 11.

Formation of a Second Winding Product

A second winding product is formed in the same manner as in the winder 400 shown in FIG. 11.

Housing of a Second Winding Product

The second winding product 109 is housed in the vessel 502. The whole second winding product 109 housed in the vessel 502 is immersed in the electrolytic solution 504 contained in the vessel 502. The other operations of the winder 500 are the same as the operations of the winder 400 shown in FIG. 11.

Formation and Housing of a Plurality of Winding Products

A plurality of winding products 109 are housed in the vessel 502 by repeating the aforementioned "Formation of a second winding product" and "Housing of a second winding product" more than once. The whole plurality of winding products 109 housed in the vessel 502 are immersed in the electrolytic solution 504. The other operations of the winder 500 are the same as the operations of the winder 400 shown in FIG. 11.

Storage of a Plurality of Winding Products

A plurality of vacuum pumps 302 of a vacuum device 301 are stopped to close a plurality of stop valves 312. A plurality of air inflow valves 310 are opened to make the pressure inside the chamber 14 atmospheric pressure. The inside of the conveying route 408 is maintained in a vacuum state and a plurality of winding products 109 being housed in the rack 418 are stored in a vacuum environment.

Extraction of a Plurality of Winding Products

The plurality of vacuum pumps 302 of a vacuum device 416 stop. The plurality of stop valves 312 are closed so that air may not enter the vacuum pumps 302 of the vacuum device 416 via the pipe line 309. The plurality of air inflow valves 310 of the vacuum device 416 are opened and air enters the conveying route 408 via the air inflow valves 310. The pressure inside the conveying route 408 becomes atmospheric pressure. This makes the periphery of the electrolytic solution 504 in the vessel 502 changed to the atmospheric state from the vacuum state. As a result, the electrolytic solution 504 naturally enters the gap between each of the separating films and each of the electrodes. The door not shown is opened and the vessel 502 where the plurality of winding products 109 are being housed is taken out of the conveying route 408.

Advantages of the Present Invention

According to the winder 500 of the present invention, like the winder 400 shown in FIG. 11, there is no need to repeat opening and closing the door 22 and activating and stopping the vacuum pumps 302 to form a plurality of winding products 109. This reduces man-hours for forming the plurality of winding products 109 in the vacuum environment. In addition, when the winding products 109 are extracted, the pressure inside the chamber 14 becomes atmospheric pressure. This allows the electrolytic solution 504 to naturally enter the gap that is in the vacuum state between each of the separating films and each of the electrodes. As a result, the winder 500 can inject the electrolytic solution 504 into the winding products 109.

While embodiments of the present invention have been described so far in accordance with the drawings, the present invention is not limited to such embodiments shown in the drawings. For example, the number of the vacuum pumps is not limited to two or four and the number may be one, three or five or more.

In the winder 350 shown in FIG. 7, a plurality of winding products 109 may be housed in the bag 358 with the electrolytic solution contained therein. When the plurality of winding products 109 are extracted, the pressure inside the chamber 14 becomes atmospheric pressure. This allows the electrolytic solution in the bag 358 to naturally enter the gap that is in the vacuum state between each of the separating films and each of the electrodes. As a result, the winder 350 can inject the electrolytic solution into the winding products 109.

According to the winder of the present invention, a plurality of winding products can be conveyed to a later process with separating films and electrodes being in contact to each other. In the later process, to produce a battery or a capacitor, this makes it possible to easily and rapidly inject an electrolytic solution between each of the separating films and each of the electrodes and thus being widely used to produce the battery or the capacitor.

What is claimed is:

1. A winder comprising:
   a winding mechanism configured to wind a belt-shaped raw film around a winding core to form a plurality of winding products, the belt-shaped raw film being composed of a plurality of electrodes and a plurality of separating films;
   a chamber housing the winding mechanism and the belt-shaped raw film;
   at least one vacuum pump configured to suck air from the chamber; and
   a product case disposed in the chamber and configured to store the plurality of winding products such that each of the winding products is capable of having a vacuum, and each of the winding products is capable of being formed with use of the winding mechanism disposed in the chamber with the winding products having the vacuum between a respective electrode of the plurality of electrodes and a respective separating film of the plurality of separating films, and the product case being sized and configured to simultaneously store the plurality of winding products and have an electrolytic solution disposed within the product case at a depth enough to completely immerse each of the winding products such that the electrolytic solution enters a gap that is in a vacuum state between the respective electrode of the plurality of electrodes and the respective separating film of the plurality of separating films.

2. The winder according to claim 1, further comprising a winding product carrier configured to feed the plurality of winding products from the winding mechanism to the product case.

3. The winder according to claim 1, wherein the product case houses the plurality of winding products in a bag to seal the bag.

4. A method for winding a belt-shaped raw film around a winding core with use of a winding mechanism, the belt-shaped raw film being composed of a plurality of electrodes and a plurality of separating films, the method comprising:
setting a chamber where the winding mechanism and the belt-shaped raw film is housed at vacuum pressure;
winding the raw film with use of the winding mechanism in the chamber set at vacuum pressure; and
storing a plurality of winding products in a product case in the chamber, each of the plurality of winding products formed by winding the raw film with use of the winding mechanism in the chamber, and each of the winding products having a vacuum between a respective electrode of the plurality of electrodes and a respective separating film of the plurality of separating films, and the product case being sized and configured to simultaneously store the plurality of winding products and have an electrolytic solution disposed within the product case at a depth enough to completely immerse each of the winding products such that the electrolytic solution enters a gap that is in the vacuum between the respective electrode of the plurality of electrodes and the respective separating film of the plurality of separating films.

5. The method for winding a belt-shaped raw film according to claim 4, further comprising
feeding the plurality of winding products from the winding mechanism to the product case.

6. The method for winding a belt-shaped raw film according to claim 4, further comprising
housing the plurality of winding products in a bag to seal the bag.

* * * * *